United States Patent
Honda et al.

(10) Patent No.: US 10,535,870 B2
(45) Date of Patent: Jan. 14, 2020

(54) ELECTRICAL DEVICE

(71) Applicant: NISSAN MOTOR CO., LTD., Yokohama-shi, Kanagawa (JP)

(72) Inventors: Chihiro Honda, Kanagawa (JP); Shinji Yamamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/112,725

(22) PCT Filed: Jan. 24, 2014

(86) PCT No.: PCT/JP2014/051529
§ 371 (c)(1),
(2) Date: Jul. 20, 2016

(87) PCT Pub. No.: WO2015/111189
PCT Pub. Date: Jul. 30, 2015

(65) Prior Publication Data
US 2016/0336593 A1  Nov. 17, 2016

(51) Int. Cl.
*H01M 4/36* (2006.01)
*H01M 4/134* (2010.01)
(Continued)

(52) U.S. Cl.
CPC ............ *H01M 4/366* (2013.01); *H01M 4/131* (2013.01); *H01M 4/134* (2013.01); *H01M 4/386* (2013.01);
(Continued)

(58) Field of Classification Search
CPC ......... H01M 10/0525; H01M 10/0585; H01M 2004/027; H01M 2004/028;
(Continued)

(56) References Cited

U.S. PATENT DOCUMENTS 4,560,524 A  12/1985  Smuckler
6,300,013 B1  10/2001  Yamada et al.
(Continued)

FOREIGN PATENT DOCUMENTS

CN  1272698 A  11/2000
CN  1444301 A  9/2003
(Continued)

OTHER PUBLICATIONS

S. Yoon, C.-M.Park, H. Kim, H.-J.Sohn. Electrochemical properties of Si—Zn—C composite as an anode material for lithium-ion batteries, Journal of Power Sources 167 (2007) 520-523.*
(Continued)

*Primary Examiner* — Carlos Barcena
(74) *Attorney, Agent, or Firm* — Foley & Lardner LLP

(57) ABSTRACT

An electrical device having a power generating element which includes a positive electrode containing a positive electrode active material, a negative electrode containing a negative electrode active material, and a separator, in which the coating amount of a negative electrode active material layer is set at 4 to 11 mg/cm$^2$, the negative electrode active material represented by Formula (1), the positive electrode active material represented by Formula (2), and in that case, as a solid solution positive electrode active material to be contained in a positive electrode active material layer, a material represented by Formula (3) and having a particle surface that is provided with a certain amount of coating layer which is formed of an oxide or complex oxide of a metal that is selected from the group consisting of Al, Zr and Ti is used.

4 Claims, 2 Drawing Sheets

(51) Int. Cl.

| | |
|---|---|
| *H01M 4/505* | (2010.01) |
| *H01M 4/50* | (2010.01) |
| *H01M 4/38* | (2006.01) |
| *H01M 4/131* | (2010.01) |
| *H01M 10/0585* | (2010.01) |
| *H01M 10/0525* | (2010.01) |
| *H01M 4/525* | (2010.01) |
| *H01M 4/48* | (2010.01) |
| *H01M 4/02* | (2006.01) |

(52) U.S. Cl.
CPC .......... *H01M 4/483* (2013.01); *H01M 4/502* (2013.01); *H01M 4/505* (2013.01); *H01M 4/525* (2013.01); *H01M 10/0525* (2013.01); *H01M 10/0585* (2013.01); *H01M 2004/027* (2013.01); *H01M 2004/028* (2013.01); *H01M 2220/20* (2013.01); *Y02T 10/7011* (2013.01)

(58) Field of Classification Search
CPC .. H01M 2220/20; H01M 4/131; H01M 4/134; H01M 4/366; H01M 4/386; H01M 4/483; H01M 4/502; H01M 4/505; H01M 4/525
See application file for complete search history.

(56) References Cited

U.S. PATENT DOCUMENTS

| | | | |
|---|---|---|---|
| 6,680,143 B2* | 1/2004 | Thackeray | C01G 23/002 423/599 |
| 6,685,804 B1 | 2/2004 | Ikeda et al. | |
| 6,699,336 B2 | 3/2004 | Turner et al. | |
| 7,141,187 B2 | 11/2006 | Kosuzu et al. | |
| 7,192,673 B1 | 3/2007 | Ikeda et al. | |
| 7,195,842 B1 | 3/2007 | Fujimoto et al. | |
| 7,235,330 B1 | 6/2007 | Fujimoto et al. | |
| 7,241,533 B1 | 7/2007 | Ikeda et al. | |
| 7,316,792 B2 | 1/2008 | Kosuzu et al. | |
| 7,378,041 B2 | 5/2008 | Asao et al. | |
| 7,410,728 B1 | 8/2008 | Fujimoto et al. | |
| 7,425,285 B2 | 9/2008 | Asao et al. | |
| 7,479,351 B2 | 1/2009 | Matsubara et al. | |
| 7,732,095 B2 | 6/2010 | Christensen et al. | |
| 7,794,881 B1 | 9/2010 | Fujimoto et al. | |
| 7,803,290 B2 | 9/2010 | Kosuzu et al. | |
| 7,811,709 B2 | 10/2010 | Musha et al. | |
| 7,851,086 B2 | 12/2010 | Matsubara et al. | |
| 7,972,727 B2 | 7/2011 | Christensen et al. | |
| 8,216,720 B2 | 7/2012 | Fukui et al. | |
| 8,221,918 B2 | 7/2012 | Katsura et al. | |
| 8,394,534 B2 | 3/2013 | Lopez et al. | |
| 8,475,959 B2 | 7/2013 | Venkatachalam et al. | |
| 8,741,485 B2 | 6/2014 | Lopez et al. | |
| 8,916,295 B2 | 12/2014 | Ito et al. | |
| 9,070,935 B2 | 6/2015 | Murata et al. | |
| 9,263,733 B2 | 2/2016 | Wakizaka et al. | |
| 9,325,003 B2 | 4/2016 | Watanabe et al. | |
| 9,496,065 B2* | 11/2016 | Ito | H01M 4/364 |
| 9,603,245 B2 | 3/2017 | Suzuki et al. | |
| 9,680,150 B2 | 6/2017 | Yamamoto | |
| 9,954,252 B2 | 4/2018 | Ogihara et al. | |
| 2002/0044800 A1 | 4/2002 | Kimura | |
| 2002/0071991 A1* | 6/2002 | Kweon | H01M 4/131 429/231.1 |
| 2003/0148185 A1 | 8/2003 | Kusumoto et al. | |
| 2003/0157407 A1 | 8/2003 | Kosuzu et al. | |
| 2004/0029012 A1 | 2/2004 | Tanizaki et al. | |
| 2004/0137327 A1* | 7/2004 | Gross | B22F 1/0003 429/231.8 |
| 2004/0191630 A1 | 9/2004 | Kawamura et al. | |
| 2005/0208379 A1 | 9/2005 | Musha et al. | |
| 2005/0244711 A1 | 11/2005 | Fukui et al. | |
| 2006/0115735 A1 | 1/2006 | Yasuda et al. | |
| 2006/0035149 A1 | 2/2006 | Nanba et al. | |
| 2006/0040182 A1 | 2/2006 | Kawakami et al. | |
| 2006/0051675 A1 | 3/2006 | Musha et al. | |
| 2006/0105242 A1* | 5/2006 | Sato | H01M 4/13 429/231.95 |
| 2006/0237697 A1 | 10/2006 | Kosuzu et al. | |
| 2007/0048612 A1 | 3/2007 | Nakajima et al. | |
| 2007/0128517 A1 | 6/2007 | Christensen et al. | |
| 2007/0148544 A1 | 6/2007 | Le | |
| 2007/0196732 A1 | 8/2007 | Tatebayashi et al. | |
| 2007/0200101 A1 | 8/2007 | Asao et al. | |
| 2008/0003503 A1 | 1/2008 | Kawakami et al. | |
| 2008/0090152 A1 | 4/2008 | Kosuzu et al. | |
| 2008/0118837 A1 | 5/2008 | Shirane et al. | |
| 2009/0061322 A1 | 3/2009 | Kawakami et al. | |
| 2009/0092892 A1 | 4/2009 | Yamaguchi et al. | |
| 2009/0098458 A1 | 4/2009 | Fujii et al. | |
| 2009/0239151 A1 | 9/2009 | Nakanishi et al. | |
| 2009/0297951 A1 | 12/2009 | Katsura et al. | |
| 2010/0009258 A1 | 1/2010 | Hasegawa et al. | |
| 2010/0075226 A1 | 3/2010 | Pham et al. | |
| 2010/0119942 A1 | 5/2010 | Kumar | |
| 2010/0167126 A1 | 7/2010 | Christensen et al. | |
| 2010/0178571 A1 | 7/2010 | Nanba et al. | |
| 2010/0203396 A1 | 8/2010 | Murata | |
| 2010/0233543 A1 | 9/2010 | Numata et al. | |
| 2010/0270497 A1 | 10/2010 | Hezeque et al. | |
| 2010/0288077 A1 | 11/2010 | Le | |
| 2010/0323098 A1 | 12/2010 | Kosuzu et al. | |
| 2011/0052985 A1 | 3/2011 | Kashiwazaki et al. | |
| 2011/0084229 A1 | 4/2011 | Kawakami et al. | |
| 2011/0183173 A1 | 7/2011 | Muraoka et al. | |
| 2011/0183209 A1 | 7/2011 | Christensen et al. | |
| 2011/0262809 A1 | 10/2011 | Kumagai et al. | |
| 2011/0281180 A1 | 11/2011 | Kim et al. | |
| 2012/0153220 A1 | 6/2012 | Watanabe et al. | |
| 2012/0160866 A1 | 6/2012 | Maguire | |
| 2012/0175551 A1 | 7/2012 | Watanabe et al. | |
| 2012/0200200 A1 | 8/2012 | Jung et al. | |
| 2012/0208087 A1 | 8/2012 | Yamamoto et al. | |
| 2012/0276446 A1 | 11/2012 | Kawai | |
| 2012/0301786 A1 | 11/2012 | Takamuku et al. | |
| 2013/0048340 A1 | 2/2013 | Bando et al. | |
| 2013/0089783 A1 | 4/2013 | Yoo et al. | |
| 2013/0108922 A1 | 5/2013 | Shinozaki et al. | |
| 2013/0136986 A1 | 5/2013 | Scoyer et al. | |
| 2013/0202967 A1 | 8/2013 | Kim et al. | |
| 2013/0240800 A1 | 9/2013 | Watanabe et al. | |
| 2013/0288122 A1 | 10/2013 | Matsushima et al. | |
| 2013/0295438 A1 | 11/2013 | Itoh | |
| 2013/0337332 A1 | 12/2013 | Ito et al. | |
| 2013/0341560 A1 | 12/2013 | Watanabe et al. | |
| 2014/0017564 A1 | 1/2014 | Suzuki et al. | |
| 2014/0086788 A1 | 3/2014 | Watanabe et al. | |
| 2014/0086792 A1* | 3/2014 | Watanabe | H01M 4/38 420/589 |
| 2014/0099229 A1 | 4/2014 | Watanabe et al. | |
| 2014/0319414 A1 | 10/2014 | Watanabe et al. | |
| 2014/0353546 A1 | 12/2014 | Watanabe et al. | |
| 2014/0356718 A1 | 12/2014 | Ito et al. | |
| 2014/0374666 A1 | 12/2014 | Watanabe et al. | |
| 2015/0044513 A1 | 2/2015 | Endoh et al. | |
| 2015/0295228 A1 | 10/2015 | Yamamoto et al. | |
| 2015/0303450 A1 | 10/2015 | Miki et al. | |
| 2015/0303451 A1 | 10/2015 | Miki et al. | |
| 2015/0303455 A1 | 10/2015 | Watanabe et al. | |
| 2015/0303464 A1 | 10/2015 | Watanabe et al. | |
| 2015/0303465 A1 | 10/2015 | Watanabe et al. | |
| 2015/0303466 A1 | 10/2015 | Yamamoto et al. | |
| 2015/0311500 A1 | 10/2015 | Miki et al. | |
| 2015/0311517 A1 | 10/2015 | Yamamoto et al. | |
| 2016/0285076 A1 | 9/2016 | Yamamoto et al. | |
| 2016/0285077 A1 | 9/2016 | Miki et al. | |
| 2016/0285088 A1 | 9/2016 | Watanabe et al. | |
| 2016/0336593 A1 | 11/2016 | Honda et al. | |

(56) References Cited

U.S. PATENT DOCUMENTS

| | | | |
|---|---|---|---|
| 2017/0005362 A1 | 1/2017 | Nakagawa et al. | |
| 2017/0012316 A1 | 1/2017 | Ogihara et al. | |

FOREIGN PATENT DOCUMENTS

| | | | |
|---|---|---|---|
| CN | 1663065 A | 8/2005 | |
| CN | 1714463 A | 12/2005 | |
| CN | 1765024 A | 4/2006 | |
| CN | 1770513 A | 5/2006 | |
| CN | 101179126 A | 5/2008 | |
| CN | 101233632 A | 7/2008 | |
| CN | 101593828 A | 12/2009 | |
| CN | 102326284 A | 1/2012 | |
| CN | 102760872 A | 10/2012 | |
| CN | 104170127 A | 11/2014 | |
| EP | 1 313 158 A2 | 5/2003 | |
| EP | 2 717 356 A1 | 4/2014 | |
| EP | 2 717 357 A1 | 4/2014 | |
| EP | 2 793 301 A1 | 10/2014 | |
| EP | 2 800 176 A1 | 11/2014 | |
| JP | 08-250117 A | 9/1996 | |
| JP | 2000-113885 A | 4/2000 | |
| JP | 2000-299108 A | 10/2000 | |
| JP | 2001-196052 A | 7/2001 | |
| JP | 2002-083594 A | 3/2002 | |
| JP | 2003-331826 A | 11/2003 | |
| JP | 2004-119199 A | 4/2004 | |
| JP | 2004-178922 A | 6/2004 | |
| JP | 2004-185810 A | 7/2004 | |
| JP | 2004-185984 A | 7/2004 | |
| JP | 2004-228059 A | 8/2004 | |
| JP | 2004-296412 A | 10/2004 | |
| JP | 2004-311428 A | 11/2004 | |
| JP | 2004-311429 A | 11/2004 | |
| JP | 2005-011650 A | 1/2005 | |
| JP | 2005-011699 A | 1/2005 | |
| JP | 2005-044672 A | 2/2005 | |
| JP | 2005-078999 A | 3/2005 | |
| JP | 2005-116390 A | 4/2005 | |
| JP | 2006-120324 A | 5/2006 | |
| JP | 2006-216277 A | 8/2006 | |
| JP | 2007-026805 A | 2/2007 | |
| JP | 2007-026926 A | 2/2007 | |
| JP | 2007-149604 A | 6/2007 | |
| JP | 2007-305424 A | 11/2007 | |
| JP | 2008-004535 A | 1/2008 | |
| JP | 2008-016446 A | 1/2008 | |
| JP | 2008-270201 A | 11/2008 | |
| JP | 2009-032644 A | 2/2009 | |
| JP | 2009-517850 A | 4/2009 | |
| JP | 2009-099328 A | 5/2009 | |
| JP | 2009-224239 | 10/2009 | |
| JP | 2009-238663 A | 10/2009 | |
| JP | 2010-135336 A | 6/2010 | |
| JP | 2010-205609 A | 9/2010 | |
| JP | 2011-048969 A | 3/2011 | |
| JP | 2012-033475 A | 2/2012 | |
| JP | 2012-094454 A | 5/2012 | |
| JP | 4954717 B2 | 6/2012 | |
| JP | 2012-142154 A | 7/2012 | |
| JP | 2012-151106 A | 8/2012 | |
| JP | 2012-185913 A | 9/2012 | |
| JP | 5046302 B2 | 10/2012 | |
| JP | 2012-248286 A | 12/2012 | |
| JP | 2013-131432 A | 7/2013 | |
| JP | 2013-161785 A | 8/2013 | |
| JP | 2013225502 A * | 10/2013 | |
| JP | 2013225502 A2 * | 10/2013 | |
| KR | 10-2003-0041816 A | 5/2003 | |
| KR | 10-2005-0075449 A | 7/2005 | |
| KR | 2005-0075449 A | 7/2005 | |
| KR | 10-2008-0019801 A | 3/2008 | |
| KR | 10-2008-0032037 A | 4/2008 | |
| KR | 10-2012-0081987 A | 7/2012 | |
| KR | 10-2012-0089845 A | 8/2012 | |
| KR | 10-2013-0128008 A | 11/2013 | |
| KR | 2013-0128008 A | 11/2013 | |
| TW | 201203673 A1 | 1/2012 | |
| TW | 201206826 A1 | 2/2012 | |
| WO | WO-2004/004031 A1 | 1/2004 | |
| WO | WO-2004/086539 A1 | 10/2004 | |
| WO | WO-2007/015508 A1 | 2/2007 | |
| WO | WO-2008/086041 A1 | 7/2008 | |
| WO | WO-2008/097723 A1 | 8/2008 | |
| WO | WO-2010/150513 A1 | 12/2010 | |
| WO | WO-2011/065503 A1 | 6/2011 | |
| WO | WO-2011/065504 A1 | 6/2011 | |
| WO | WO-2012/000854 A1 | 1/2012 | |
| WO | WO-2012/070306 A1 | 5/2012 | |
| WO | WO-2012/091060 A1 | 7/2012 | |
| WO | WO-2012/121240 A1 | 9/2012 | |
| WO | WO-2012/160858 A1 | 11/2012 | |
| WO | WO-2012/160866 A1 | 11/2012 | |
| WO | WO-2012/161190 A1 | 11/2012 | |
| WO | WO-2012160866 A1 * | 11/2012 | ............ H01M 4/38 |
| WO | WO-2013/005737 A1 | 1/2013 | |
| WO | WO-2013/055646 A1 | 4/2013 | |
| WO | WO-2013/088846 A1 | 6/2013 | |
| WO | WO-2013/094465 A1 | 6/2013 | |
| WO | WO-2013/099440 A1 | 7/2013 | |
| WO | WO-2013/099441 A1 | 7/2013 | |
| WO | WO-2013/115390 A1 | 8/2013 | |
| WO | WO-2013/145913 A1 | 10/2013 | |

OTHER PUBLICATIONS

K. Shibukawa, Y. Irii, F. Matsumoyo, A. Ito, Y. Ohsawa, M. Hatano, Y. Sato. "Sankabutsu Coating o Hodokoshita Li Kajo Koyotaikei Seikyoku Li[Li0.2Ni0.183Co0.03Mn0.583] 02 no Denkyoku Tokusei", The Electrochemical Society of Japan Dai 79 Kai Taikai Koen Yoshishu, Mar. 29, 2012, p. 115.*

U.S. Appl. No. 15/113,096, filed Jul. 21, 2016, Nissan Motor Co., Ltd.

U.S. Appl. No. 15/113,503, filed Jul. 22, 2016, Nissan Motor Co., Ltd.

U.S. Appl. No. 15/113,512, filed Jul. 22, 2016, Nissan Motor Co., Ltd.

Korean Office Action, Application No. 10-2016-7019739, dated Dec. 1, 2017, 5 pages.

Korean Office Action, Application No. 10-2016-7019742, dated Dec. 15, 2017, 7 pages.

USPTO Office Action, U.S. Appl. No. 14/646,218, dated Jan. 9, 2018, 23 pages.

USPTO Office Action, U.S. Appl. No. 14/646,433, dated Dec. 22, 2017, 17 pages.

Extended European Search Report dated Dec. 3, 2014, from related European Patent Application No. 12856913.4, 3 pages.

USPTO Office Action, U.S. Appl. No. 14/442,678, dated Aug. 21, 2017, 23 pages.

USPTO Office Action, U.S. Appl. No. 14/442,957, dated Sep. 21, 2017, 11 pages.

USPTO Office Action, U.S. Appl. No. 14/442,957, dated Dec. 19, 2016, 14 pages.

USPTO Office Action, U.S. Appl. No. 14/443,151, dated Jun. 22, 2017, 14 pages.

USPTO Office Action, U.S. Appl. No. 14/443,151, dated Nov. 28, 2016, 16 pages.

USPTO Office Action, U.S. Appl. No. 14/443,151, dated Oct. 19, 2017, 14 pages.

USPTO Office Action, U.S. Appl. No. 14/443,572, dated Apr. 21, 2017, 16 pages.

USPTO Office Action, U.S. Appl. No. 14/443,572, dated Sep. 11, 2017, 13 pages.

USPTO Office Action, U.S. Appl. No. 14/443,572, dated Oct. 14, 2016, 25 pages.

USPTO Office Action, U.S. Appl. No. 14/443,852, dated Jun. 2, 2017, 19 pages.

USPTO Office Action, U.S. Appl. No. 14/443,852, dated Sep. 28, 2017, 17 pages.

(56) References Cited

OTHER PUBLICATIONS

USPTO Office Action, U.S. Appl. No. 14/443,852, dated Oct. 17, 2016, 17 pages.
USPTO Office Action, U.S. Appl. No. 14/443,852, dated Dec. 29, 2016, 14 pages.
USPTO Office Action, U.S. Appl. No. 14/646,218, dated May 10, 2017, 22 pages.
USPTO Office Action, U.S. Appl. No. 14/646,218, dated Sep. 8, 2017, 13 pages.
USPTO Office Action, U.S. Appl. No. 14/646,218, dated Oct. 14, 2016, 22 pages.
USPTO Restriction Office Action, U.S. Appl. No. 14/442,678, dated May 18, 2017, 7 pages.
USPTO Office Action, U.S. Appl. No. 14/443,236, dated May 15, 2018, 38 pages.
USPTO Office Action, U.S. Appl. No. 14/443,852, dated May 9, 2018, 27 pages.
USPTO Office Action, U.S. Appl. No. 14/646,218, dated May 9, 2018, 33 pages.
USPTO Office Action, U.S. Appl. No. 14/646,433, dated May 31, 2018, 15 pages.
USPTO Office Action, U.S. Appl. No. 14/646,590, dated May 8, 2018, 22 pages.
USPTO Office Action, U.S. Appl. No. 14/443,151, dated Jun. 15, 2018, 13 pages.
USPTO Office Action, U.S. Appl. No. 14/443,572, dated Jun. 29, 2018, 41 pages.
USPTO Office Action, U.S. Appl. No. 14/442,289, dated Jul. 30, 2018, 13 pages.
USPTO Office Action, U.S. Appl. No. 14/442,678, dated Aug. 16, 2018, 32 pages.
USPTO Office Action, U.S. Appl. No. 14/646,590, dated Aug. 28, 2018, 23 pages.
Hatchard et al., "Electrochemical Performance of SiAlSn Films Prepared by Combinatorial Sputtering," Electrochemical and Solid-State Letters, vol. 6, No. 7, 2003, pp. A129-A132.
M. A. Al-Maghrabi et al., A Combinatorial Study of the Sn—Si—C System for Li-Ion Battery Applications, Journal of the Electrochemical Society, vol. 159, No. 6, Apr. 2, 2012, pp. A711-A719.
Taiwanese Office Action, dated Mar. 19, 2014, 4 pages.
USPTO Office Action, U.S. Appl. No. 14/119,379, dated Jan. 7, 2016, 6 pages.
USPTO Office Action, U.S. Appl. No. 14/119,379, dated Apr. 15, 2016, 7 pages.
USPTO Office Action, U.S. Appl. No. 14/119,379, dated Oct. 9, 2015, 8 pages.
USPTO Office Action, U.S. Appl. No. 14/119,379, dated Feb. 10, 2015, 8 pages.
USPTO Office Action, U.S. Appl No. 14/119,379, dated May 18, 2015, 7 pages.
USPTO Office Action, U.S. Appl. No. 14/442,289, dated Feb. 20, 2018, 15 pages.
USPTO Office Action, U.S. Appl. No. 14/442,661, dated Dec. 2, 2016, 13 pages.
USPTO Office Action, U.S. Appl. No. 14/442,661, dated Sep. 19, 2017, 15 pages.
USPTO Office Action, U.S. Appl. No. 14/442,678, dated Feb. 28, 2018, 32 pages.
USPTO Office Action, U.S. Appl. No. 14/442,957, dated Apr. 3, 2018, 13 pages.
USPTO Office Action, U.S. Appl. No. 14/443,151, dated Jun. 13, 2016, 12 pages.
USPTO Office Action, U.S. Appl. No. 14/443,572, dated Feb. 14, 2018, 30 pages.
USPTO Office Action, U.S. Appl. No. 14/646,242, dated Jan. 11, 2018, 21 pages.
Japanese Office Action and English language translation dated Jan. 26, 2015, 4 pgs.
Supplementary European Search Report dated Nov. 4, 2014, 5 pgs.
Taiwanese Office Action dated Feb. 24, 2014, (6 pgs.).
USPTO Office Action, U.S. Appl. No. 14/442,661, dated Jul. 17, 2018, 11 pages.
USPTO Office Action, U.S. Appl. No. 14/646,242, dated Apr. 19, 2018, 11 pages.
USPTO Office Action, U.S. Appl. No. 14/646,242, dated Aug. 10, 2018, 11 pages.
USPTO Notice of Allowance, U.S. Appl. No. 14/442,289, dated Dec. 28, 2018, 12 pages.
USPTO Office Action, U.S. Appl. No. 14/646,242, dated Jan. 7, 2019, 18 pages.
USPTO Office Action, U.S. Appl. No. 15/113,096, dated Jan. 14, 2019, 30 pages.
USPTO Office Action, U.S. Appl. No. 14/119,062, dated Nov. 21, 2018, 15 pages.
USPTO Office Action, U.S. Appl. No. 14/443,236, dated Nov. 16, 2018, 15 pages.
USPTO Office Action, U.S. Appl. No. 14/646,218, dated Nov. 19, 2018, 14 pages.
USPTO Office Action, U.S. Appl. No. 14/119,062, dated Feb. 15, 2019, 8 pages.
USPTO Office Action, U.S. Appl. No. 14/442,678, dated Mar. 7, 2019, 32 pages.
USPTO Office Action, U.S. Appl. No. 14/443,572, dated Feb. 21, 2019, 22 pages.
USPTO Office Action, U.S. Appl. No. 14/443,151, dated Mar. 20, 2019, 22 pages.
USPTO Office Action, U.S. Appl. No. 14/442,957, dated Oct. 12, 2018, 15 pages.
USPTO Office Action, U.S. Appl. No. 14/443,151, dated Oct. 12, 2018, 15 pages.
USPTO Office Action, U.S. Appl. No. 14/646,433, dated Oct. 19, 2018, 15 pages.
S. H. Park et al., Physical and Electrochemical Properties of Spherical Li $1+x(Ni1/3\ Co1/3Mn1/3)1-XO2$ Cathode Materials, Journal of Power Sources 177, 2008, pp. 177-183.
USPTO Office Action, U.S. Appl. No. 14/443,151, dated Jul. 11, 2019, 17 pages.
USPTO Notice of Allowance, U.S. Appl. No. 15/113,250, dated Jun. 21, 2019, 18 pages.
USPTO Office Action, U.S. Appl. No. 14/443,236, dated May 30, 2019, 21 pages.
USPTO Office Action, U.S. Appl. No. 14/646,218, dated May 30, 2019, 24 pages.
USPTO Office Action, U.S. Appl. No. 14/443,852, dated Apr. 16, 2019, 27 pages.
USPTO Office Action, U.S. Appl. No. 14/646,433, dated May 16, 2019, 21 pages.
USPTO Office Action, U.S. Appl. No. 14/442,957, dated May 16, 2019, 15 pages.
USPTO Office Action, U.S. Appl. No. 15/113,096, dated May 16, 2019, 18 pages.
USPTO Office Action, U.S. Appl. No. 14/443,236, dated Oct. 7, 2019, 22 pages.
USPTO Office Action, U.S. Appl. No. 14/646,242, dated Oct. 21, 2019, 12 pages.
Cho et al, Zero-Strain Intercalation Cathode for Rechargeable Li-Ion Cell, A Journal of the German Chemical Society, vol. 40, Issue 18, Sep. 17, 2001, pp. 3367-3369 (Year: 2001).
USPTO Office Action, U.S. Appl. No. 14/443,572, dated Sep. 3, 2019, 22 pages.
USPTO Office Action, U.S. Appl. No. 14/443,852, dated Sep. 4, 2019, 34 pages.
USPTO Office Action, U.S. Appl. No. 15/113,096, dated Sep. 3, 2019, 17 pages.

* cited by examiner

ELECTRICAL DEVICE

TECHNICAL FIELD

The present invention relates to an electrical device. The electrical device according to the present invention is used for a driving power source or an auxiliary power source of a motor serving as, for example, a secondary battery or a capacitor for use in a vehicle such as an electric vehicle, a fuel cell vehicle, or a hybrid electric vehicle.

BACKGROUND ART

Recently, there has been a strong demand for reduction of the amount of carbon dioxide in order to deal with global warming. In the automobile industry, the reduction of emissions of carbon dioxide is highly expected in association with the spread of electric vehicles (EV) and hybrid electric vehicles (HEV). Thus, development of electrical devices such as secondary batteries for driving motors as a key to practical application of such vehicles is actively being carried out.

The secondary batteries for driving motors are required to have quite high output performance and high energy as compared with lithium ion secondary batteries for general use in mobile phones, laptop computers and the like. Therefore, lithium ion secondary batteries having the highest theoretical energy among all types of batteries are gaining more attention, and they are now being rapidly developed.

A lithium ion secondary battery generally has a constitution in which a positive electrode including a positive electrode current collector to which a positive electrode active material and the like is applied on both surfaces with use of a binder is connected, via an electrolyte layer, to a negative electrode including a negative electrode current collector to which a negative electrode active material and the like is applied on both surfaces with use of a binder, and the battery is housed in a battery case.

In a lithium ion secondary battery of a related art, a carbon graphite-based material, which is advantageous in terms of charge and discharge cycle life or cost, has been used for the negative electrode. However, the carbon•graphite-based negative electrode material has the disadvantage that a theoretical charge and discharge capacity equal to or larger than 372 mAh/g, which is obtained from $LiC_6$ as a compound introduced with maximum amount of lithium, cannot be ensured because the battery is charged and discharged by absorbing lithium ions into graphite crystals and desorbing the lithium ions therefrom. Thus, by use of the carbon•graphite-based negative electrode material, it is difficult to ensure a capacity and energy density that are high enough to satisfy vehicle usage on the practical level.

On the other hand, a battery using a $SiO_x$ (0<x<2) material, which can form a compound with Li, for a negative electrode has a higher energy density than the carbon•graphite-based negative electrode material of a related art. Therefore, such a negative electrode material is highly expected to be used for a battery in a vehicle. For example, in silicon oxide having a chemical composition of $SiO_x$, Si (nanoparticles of monocrystal) and non-crystalline (amorphous) $SiO_2$ are present as separate phases when it is observed at microscopic level.

The silicon oxide has a tetrahedral structure as a unit structure. Silicon compounds other than $SiO_2$ (intermediate oxide) can be expressed as $Si_2O$, SiO, or $Si_2O_3$ corresponding to oxygen number of 1, 2, or 3 at the corner of the tetrahedron. However, as these intermediate oxides are thermodynamically unstable, it is very difficult for them to be present as a monocrystal. Thus, $SiO_x$ has a non-crystalline structure in which the unit structures are randomly arranged, and such a non-crystalline structure is formed such that plural non-crystalline compounds are present without forming an interface, and it is mainly composed of a homogeneous non-crystalline structure part. Thus, $SiO_x$ has a structure in which Si nanoparticles are dispersed in non-crystalline $SiO_2$.

In the case of such $SiO_x$, only Si is involved with charging and discharging, and $SiO_2$ is not involved with charging and discharging. Thus, $SiO_x$ indicates average composition of them. In $SiO_x$, while 1 mol of Si absorbs and desorbs 4.4 mol of lithium ions in accordance with the reaction formula (A) and a reversible capacity component of $Li_{22}Si_5$ (=$Li_{4.4}$Si) with a theoretical capacity of 4200 mAh/g is generated, there is a significant problem that, when 1 mol of a SiO absorbs and desorbs 4.3 mol of lithium ions in accordance with the reaction formula (B), $Li_4SiO_4$ as a cause of having irreversible capacity is generated together with $Li_{4.4}$Si during initial Li absorption.

[Chem. 1]

$$Si + 4.4Li^+ + e^- \rightleftharpoons Li_{4.4}Si \qquad (A)$$

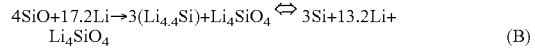

$$4SiO + 17.2Li \rightarrow 3(Li_{4.4}Si) + Li_4SiO_4 \rightleftharpoons 3Si + 13.2Li + Li_4SiO_4 \qquad (B)$$

Meanwhile, examples of a lithium silicate compound containing Li include $Li_ySiO_x$ (0<y, 0<x<2) such as $Li_4SiO_4$, $Li_2SiO_3$, $Li_2Si_2O_5$, $Li_2Si_3O_8$, and $Li_6Si_4O_{11}$. However, since these $Li_ySiO$), have very small electron conductivity and $SiO_2$ has no electron conductivity, there is a problem of having increased negative electrode resistance. As a result, it becomes very difficult for lithium ions to get desorbed from a negative electrode active material or get absorbed into a negative electrode active material.

However, in a lithium ion secondary battery using the material alloyed with Li for the negative electrode, expansion-shrinkage in the negative electrode is large at the time of charging and discharging. For example, volumetric expansion of the graphite material in the case of absorbing Li ions is approximately 1.2 times. However, the Si material has a problem of a decrease in cycle life of the electrode due to a large volumetric change (approximately 4 times) which is caused by transition from an amorphous state to a crystal state when Si is alloyed with Li. In addition, when using the Si negative electrode active material, the battery capacity has a trade-off relationship with cycle durability. Thus, there has been a problem that it is difficult to increase the capacity and improve the cycle durability concurrently.

In order to deal with the problems described above, there is known a negative electrode for a lithium ion secondary battery containing $SiO_x$ and a graphite material (for example, see Patent Literature 1). According to the invention described in the Patent Literature 1, it is described in paragraph [0013] that, by having $SiO_x$ at minimum content, not only the high capacity but also good cycle lifetime can be exhibited.

CITATION LIST

Patent Literature

Patent Literature 1: JP 2009-517850 W

SUMMARY OF THE INVENTION

Technical Problem

The lithium ion secondary battery of the Patent Literature 1, which uses a negative electrode containing $SiO_x$ and a carbon material, is described to exhibit good cycle properties. However, according to research by the present inventors, it was found that, when such a negative electrode is combined with a positive electrode using a solid solution positive electrode active material, the high capacity property as a characteristic of a solid solution positive electrode active material are not fully exhibited and also, in terms of rate property, it is difficult to have performances at sufficient level.

Accordingly, an object of the present invention is to provide a means such that an electrical device such as a lithium ion secondary battery that has a positive electrode using a solid solution positive electrode active material can be provided with satisfactory performance in terms of rate property while the high capacity property as a characteristic of a solid solution positive electrode active material is sufficiently exhibited.

The present inventors conducted intensive studies to solve the aforementioned problems. As a result, they found that, when a negative electrode containing a negative electrode active material obtained by mixing a Si-containing alloy with a carbon material and a positive electrode containing a solid solution positive electrode active material coated with a predetermined metal oxide are used and a coating amount (weight per unit area) of the negative electrode active material layer is controlled to a predetermined value, the aforementioned problem can be solved. The present invention is completed accordingly.

Namely, the present invention relates to an electrical device that has a power generating element containing the following: a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator.

Furthermore, the coating amount of the negative electrode active material layer is 4 to 11 mg/cm². Furthermore, the negative electrode active material layer contains a negative electrode active material which is represented by the following formula (1).
[Mathematical formula 1]

$$\alpha(\text{Si-containing alloy}) + \beta(\text{carbon material}) \quad (1)$$

In the formula, $\alpha$ and $\beta$ represent % by weight of each component in the negative electrode active material layer, and $80 \leq \alpha+\beta \leq 98$, $3 \leq \alpha \leq 40$, and $40 \leq \beta \leq 95$.

Furthermore, the positive electrode active material layer contains a positive electrode active material which is represented by the following formula (2).
[Mathematical formula 2]

$$e \, (\text{solid solution positive electrode active material}) \quad (2)$$

In the formula, e represents % by weight of each component in the positive electrode active material layer, and $80 \leq e \leq 98$.

In that case, the above solid solution positive electrode active material is represented by the following Formula (3).
[Mathematical Formula 3]

$$\text{Li}_{1.5}[\text{Ni}_a\text{Mn}_b\text{Co}_c[\text{Li}]_d]\text{O}_z \quad (3)$$

In the formula, z represents an oxygen number for satisfying the atomic valence and a+b+c+d=1.5, $0.1 \leq d \leq 0.4$, and $1.1 \leq [a+b+c] \leq 1.4$.

Furthermore, it is characterized in that a coating layer having oxide or composite oxide of the metal selected from the group consisting of Al, Zr, and Ti is formed on a surface of particles of the solid solution positive electrode active material and the content of the above oxide or composite oxide in the solid solution positive electrode active material is 0.1 to 3.0% by weight in terms of oxide.

Effects of the Invention

According to the present invention, an effect of significantly reducing a decrease in initial discharge capacity, which is caused by initial irreversible capacity of a negative electrode active material, can be obtained by using a solid solution material coated with predetermined metal oxide as a positive electrode active material. As a result, according to the electrical device of the present invention, satisfactory performance can be obtained in terms of rate property while the high capacity property as a characteristic of a solid solution positive electrode active material is sufficiently expressed.

DESCRIPTION OF EMBODIMENTS

Figure 1:
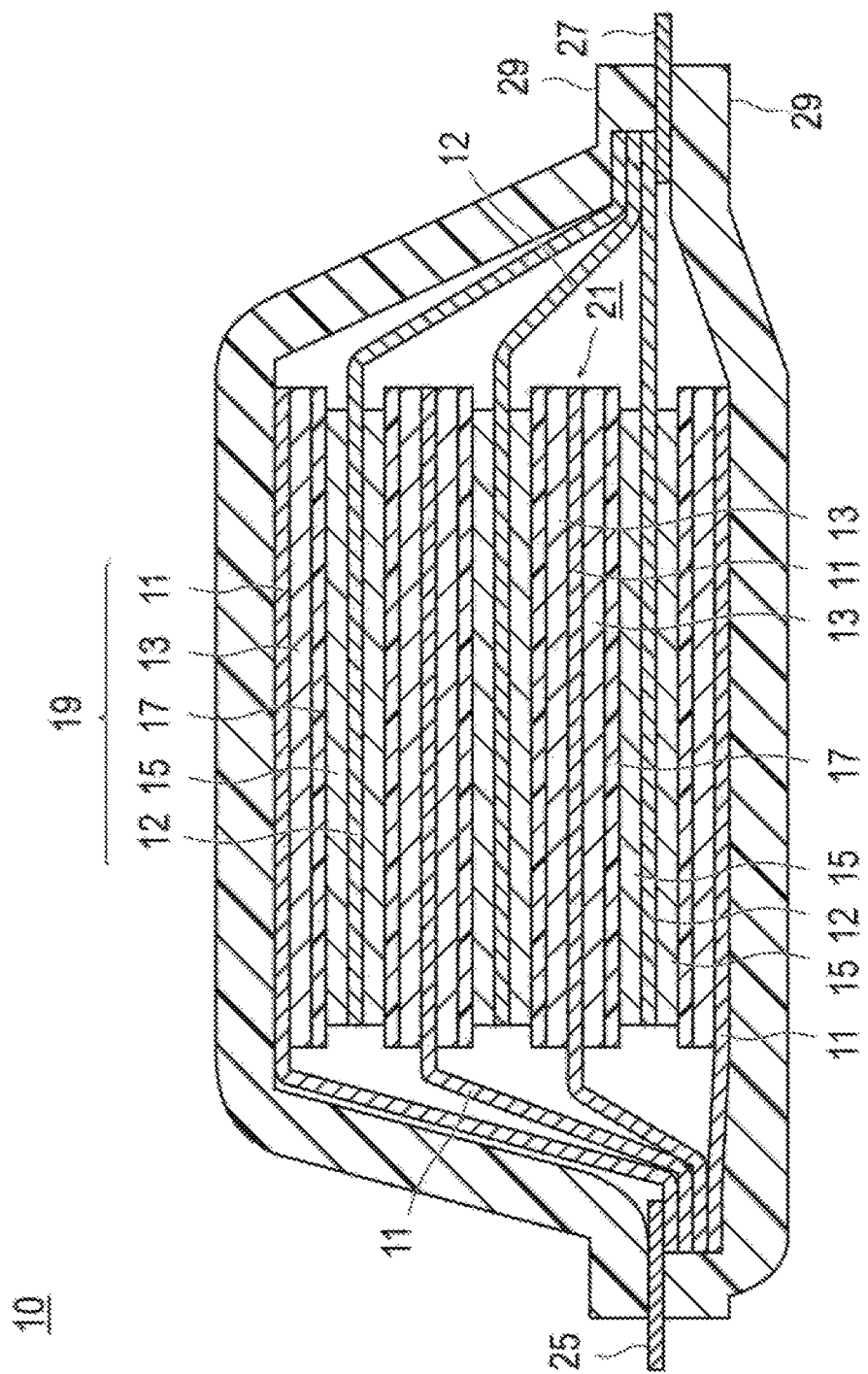
FIG. 1 is a schematic cross-sectional view illustrating the basic structure of a non-aqueous electrolyte lithium ion secondary battery, which is flat type (stack type) and not a bipolar type, as one embodiment of the electrical device according to the present invention.

According to one embodiment of the present invention, provided is an electrical device which has a power generating element containing a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator, in which a coating amount of the negative electrode active material layer is 4 to 11 mg/cm², the negative electrode active material layer contains a negative electrode active material which is represented by the following Formula (1):
[Mathematical Formula 4]

$$\alpha(\text{Si-containing alloy}) + \beta(\text{carbon material}) \quad (1)$$

in the formula, $\alpha$ and $\beta$ represent % by weight of each component in the negative electrode active material layer, and $80 \leq \alpha+\beta \leq 98$, $3 \leq \alpha \leq 40$, and $40 \leq \beta \leq 95$, the positive electrode active material layer contains a positive electrode active material which is represented by the following Formula (2):
[Mathematical Formula 5]

$$e \, (\text{solid solution positive electrode active material}) \quad (2)$$

in the formula, e represents % by weight of each component in the positive electrode active material layer, and $80 \leq e \leq 98$, the solid solution positive electrode active material is represented by the following Formula (3):
[Mathematical Formula 6]

$$\text{Li}_{1.5}[\text{Ni}_a\text{Mn}_b\text{Co}_c[\text{Li}]_d]\text{O}_z \quad (3)$$

in the formula, z represents an oxygen number for satisfying the atomic valence and a+b+c+d=1.5, 0.1≤d≤0.4, and 1.1≤[a+b+c]≤1.4, and a coating layer composed of oxide or composite oxide of the metal selected from the group consisting of Al, Zr, and Ti is formed on a surface of particles of the solid solution positive electrode active material and the content of the above oxide or composite oxide in the solid solution positive electrode active material is 0.1 to 3.0% by weight in terms of oxide.

Hereinbelow, the basic structure of the electrical device according to the present invention is described. In this embodiment, descriptions are given by exemplifying a lithium ion secondary battery as an electrical device.

First, because a lithium ion secondary battery obtained by using the electrical device according to the present invention has large cell (single battery layer) voltage so that high energy density and high output density can be achieved. Thus, the lithium ion secondary battery of this embodiment is suitable for a driving power source or an auxiliary power source for a vehicle. Accordingly, it can be desirably used as a lithium ion secondary battery for a driving power source and the like for use in a vehicle. Further, it can be applied appropriately to lithium ion secondary batteries for mobile devices such as mobile phones.

For example, when the lithium ion secondary battery is classified in terms of the shape and structure, the lithium ion secondary battery may be applicable to any batteries having known shapes and structures such as a laminate type (flat) battery and a wound type (cylindrical) battery. The structure of the laminate type (flat) battery contributes to ensuring long-term reliability by a simple sealing technology such as simple thermo-compression bonding, and therefore it has the advantage in terms of cost and workability.

Furthermore, in terms of electrical connection (electrode structure) inside the lithium ion secondary battery, the lithium ion secondary battery may be applicable not only to a non-bipolar (internal parallel connection type) battery but also to a bipolar (internal serial connection type) battery.

When the lithium ion secondary battery is classified in terms of the type of an electrolyte layer used therein, the lithium ion secondary battery may be applicable to batteries including various types of known electrolyte layers such as a solution electrolyte type battery in which a solution electrolyte such as a non-aqueous electrolyte solution is used for an electrolyte layer and a polymer battery in which a polymer electrolyte is used for an electrolyte layer. The polymer battery is classified into a gel electrolyte type battery using a polymer gel electrolyte (also simply referred to as a gel electrolyte) and a solid polymer (all solid state) type battery using a polymer solid electrolyte (also simply referred to as a polymer electrolyte).

Therefore, in the following descriptions, as an example of a lithium ion secondary battery according to this embodiment, a non-bipolar (internal parallel connection type) lithium ion secondary battery will be described briefly with reference to the drawings. However, the technical scope of the electrical device according to the present invention and lithium ion secondary battery according to this embodiment should not be limited to the following descriptions.

<Overall Structure of Battery>

FIG. 1 is a schematic cross-sectional view showing the entire configuration of a flat (laminate type) lithium ion secondary battery (hereinafter, also simply referred to as a "laminate type battery") which is one representative embodiment of the electrical device according to the present invention.

As shown in FIG. 1, a laminate type battery 10 according to this embodiment has a configuration in which a substantially rectangular power generating element 21, in which a charging and discharging reaction actually progresses, is sealed inside a laminated sheet 29 as a battery outer casing. The power generating element 21 has a configuration in which a positive electrode having a positive electrode active material layer 13 provided on both surfaces of a positive electrode current collector 11, electrolyte layers 17, and a negative electrode having a negative electrode active material layer 15 provided on both surfaces of a negative electrode current collector 12 are laminated. Specifically, the positive electrode, the electrolyte layer, and the negative electrode are laminated in this order such that one positive electrode active material layer 13 faces an adjacent negative electrode active material layer 15 with the electrolyte layer 17 interposed therebetween.

Accordingly, the positive electrode, the electrolyte layer, and the negative electrode that are adjacent to one another constitute a single battery layer 19. Thus, it can be also said that the laminate type battery 10 shown in FIG. 1 has a configuration in which the plural single battery layers 19 are laminated so as to be electrically connected in parallel. Meanwhile, although the outermost positive electrode current collector located on both outermost layers of the power generating element 21 is provided with the positive electrode active material layer 13 only on one side thereof, the outermost positive electrode current collector may be provided with the active material layer on both sides thereof. That is, it is not limited to a current collector having an active material layer formed only on one surface to be used exclusively for the outermost layer, and a current collector provided with the active material layers on both sides thereof may be also used by itself. Furthermore, it is also possible that, by reversing the arrangement of the positive electrode and the negative electrode shown in FIG. 1, the outermost negative electrode current collector is present on both outermost sides of the power generating element 21 and the negative electrode active material layer is arranged on a single side or both sides of the corresponding outermost negative electrode current collector.

A positive electrode current collecting plate 25 and a negative electrode current collecting plate 27 which are electrically conductive to the respective electrodes (the positive electrodes and the negative electrodes) are attached to the positive electrode current collector 11 and the negative electrode current collector 12, respectively. The positive electrode current collecting plate 25 and the negative electrode current collecting plate 27 are held by being inserted between the respective end portions of the laminated sheet 29 and exposed to the outside of the laminated sheet 29. The positive electrode current collecting plate 25 and the negative electrode current collecting plate 27 may be attached to the positive electrode current collector 11 and the negative electrode current collector 12 of the respective electrodes via a positive electrode lead and a negative electrode lead (not shown in the figure) as appropriate by, for example, ultrasonic welding or resistance welding.

The lithium ion secondary battery according to this embodiment is characterized by structure of positive electrode and negative electrode. Main constituent members of the battery including the positive electrode and negative electrode will be described below.

<Active Material Layer>

Active material layers (13, 15) contain an active material and further contain other additives optionally.

[Positive Electrode Active Material Layer]

The positive electrode active material layer 13 contains a positive electrode active material which consists at least of a solid solution material (also referred to herein as a "solid solution positive electrode active material").

(Solid Solution Positive Electrode Active Material)

A solid solution positive electrode active material is represented by the following Formula (3).

[Mathematical Formula 7]

$$Li_{1.5}[Ni_aMn_bCo_c[Li]_d]O_z \qquad (3)$$

In Formula (3), z represents an oxygen number for satisfying the atomic valence and a+b+c+d=1.5, 0.1≤d≤0.4, and 1.1≤[a+b+c]≤1.4.

Furthermore, a coating layer having oxide or composite oxide of the metal selected from the group consisting of Al, Zr, and Ti is formed on a surface of particles of the solid solution positive electrode active material and the content of the above oxide or composite oxide in the solid solution positive electrode active material is 0.1 to 3.0% by weight in terms of oxide. Specific composition of the metal oxide present on a surface of particles of the solid solution positive electrode active material is not particularly limited, and any theoretically possible oxide or composite oxide containing the aforementioned metal elements can be used. Preferably, $Al_2O_3$, $ZrO_2$, or $TiO_2$ is used. Meanwhile, (composite) oxide containing other element like one or more members selected from the group consisting of Nb, Sn, W, Mo, and V may be additionally contained in the coating layer.

In the related art, it is necessary to increase an amount of electricity stored per unit mass of an active material used for the positive electrode or the negative electrode in order to obtain a secondary battery having a high energy density. Among these, as the positive electrode active material, a solid solution positive electrode active material has been studied. As the solid solution positive electrode active material, a layered system lithium-containing transition metal oxide made of a solid solution of an electrochemically inactive layered $Li_2MnO_3$ and an electrochemically active layered $LiMO_2$ (herein, [M] is a transition metal such as Co, Ni, Mn, or Fe) has been studied. In a battery using the solid solution positive electrode active material, it is necessary to charge the battery to a plateau potential or more (for example, 4.4 to 4.8 V) in order to activate the solid solution positive electrode active material ($Li_2MnO_3$ composition) (in order to structurally change a part of the crystal structure to a spinel phase: phase-change). It is considered that the phase transition into the spinel phase (gradual change of the generated $LiMnO_2$ system into the spinel phase by migration of Mn) is caused by oxidation (for example, $Mn^{3+} \Rightarrow Mn^{4+}$) (irreversible phase transition caused by charge) of a transition metal element (Mn or the like) constituting the transition metal layer in the crystal structure of the positive electrode active material. However, a part of the transition metal element involved in the phase transition does not form the spinel phase (not fixed), and is eluted outside the crystal structure. In addition, in accordance with the oxidation of the transition metal, a part of lattice oxygen is released and oxygen gas is generated, and also by the generation of an oxygen defect in the crystal structure, the transition metal element is eluted. Furthermore, also by repetition of a charge and discharge cycle around the plateau potential (4.3 to 4.5 V), or by exposure to a potential around the plateau potential for a long time, elution occurs in accordance with the oxidation of the transition metal (Mn or the like) which forms the solid solution active material. Therefore, it is required to stabilize a rock salt type layered structure and to suppress the elution of the transition metal such as Mn while the $Li_2MnO_3$ composition is kept in an electrochemically active state.

It is known that, in the positive electrode using the solid solution positive electrode active material, a charge and discharge capacity or rate characteristics are impaired because an overvoltage (resistance) of the layered $Li_2MnO_3$ at the end of charge or at the end of discharge is high with respect to the layered $LiMO_2$ (for example, $LiNi_{1/2}Mn_{1/2}O_2$ or the like). In addition, there is a problem that Ni or Mn is easily eluted because an upper limit use potential is high (4.3 V or more).

When a battery is made by using a positive electrode using a solid solution active material, there is a problem that battery performance (charge and discharge characteristics, C-rate characteristics) and life time characteristics (capacity retention rate) are impaired due to deterioration of a positive electrode active material and a negative electrode active material, deterioration of an electrolyte solution (liquid shortage), generation of Li-byproduct, or the like. There is also a problem that impedance (DCR) is increased because a gap is generated between the electrodes due to accumulation of sediment or generation of gas. In addition, there is a problem that the charge and discharge capacity, the C-rate characteristics, and the capacity retention rate are further impaired due to increase of the overvoltage. In the conventional solid solution active material, it is necessary to charge the battery to a plateau potential or higher (for example, 4.4 to 4.8 V) for activation (accompanied by change of a part of the crystal structure to a spinel phase structure (phase transition)). It is considered that the partial phase transition into the spinel phase ($LiMnO_2$ system) is caused by a process of oxidation (for example, $Mn^{3+} \Rightarrow Mn^{4+}$; irreversible phase transition caused by charge) of a transition metal element (Mn, Ni, or the like) which forms the transition metal layer and a process of release of lattice oxygen in accordance with the above process in the crystal structure of the positive electrode active material. Therefore, when a charge and discharge cycle is repeated around the plateau potential (4.4 to 4.5 V) in order to obtain a high capacity, the partial phase transition and the release of oxygen proceed gradually. As a result, average voltage, capacity, or rate characteristics are impaired in accordance with the change of the crystal structure (phase transition and release of oxygen). In addition, a part of the transition metal element involved in the phase transition does not form the spinel phase (not fixed), and is eluted outside the crystal structure. Furthermore, in accordance with the oxidation of the transition metal, a part of lattice oxygen is released and oxygen gas is generated, and also by the generation of an oxygen defect in the crystal structure, the transition metal element is eluted. Furthermore, not only by repetition of the charge and discharge cycle around the plateau potential, but also by exposure to a full charge state (potential around the plateau potential) for a long time, the elution of the transition metal (Mn, Ni, or the like) which forms the solid solution active material occurs in accordance with the oxidation of the transition metal. As a result, the elution of the transition metal which is accompanied with the change of the crystal structure on the surface layer also can be a reason for reducing durability.

With regard to the aforementioned problems, an embodiment according to the invention has a constitution in which a surface of particles of the solid solution positive electrode active material has a coating layer including (composite) metal oxide such as $Al_2O_3$. By using the positive electrode active material having such a constitution, it is possible to suppress a change in the crystal structure caused by repetition of the charge and discharge cycle (for example, 4.3 to 4.5 V) after an activation treatment at a high potential (for example, 4.4 to 4.8 V) of the plateau potential or higher. Further, by forming a predetermined coating layer on a surface of the particles of the solid solution positive electrode active material, an amount of the transition metal (Mn) eluted outside the crystal structure without forming the spinel phase (without being fixed) is reduced when Mn in the transition metal layer migrates to the Li layer and a part thereof undergoes a phase transition into the spinel phase in accordance with the activation, and accordingly, performance and durability can be improved.

In addition, in the present embodiment, a part of the metal element in the coating layer preferably invades (having a region of its presence) into the surface layer of particles of solid solution positive electrode active material. Accordingly, the covalent bond to oxygen is strengthened so that release of lattice oxygen in accordance with oxidation of other transition metals occurs less; therefore, a generation amount of oxygen gas is reduced, and an occurrence of an oxygen defect in the crystal structure is also reduced. Furthermore, even by repetition of the charge and discharge cycle around the plateau potential (4.3 to 4.5 V), or by exposure to a potential around the plateau potential for a long time, the crystal structure is stabilized and release of oxygen occurs less; therefore, the elution of the transition metal (Mn or the like), which forms the solid solution active material, caused in accordance with the oxidation of the transition metal, is suppressed, and performance and durability can be improved. Moreover, the most unstable surface layer (~20 nm, or up to 30 nm) of particles of the solid solution positive electrode active material is stabilized by the coating with (composite) oxide and invasion of the metal element, and therefore performance and durability can be improved more. Furthermore, as the metal element in the coating layer does not invade the particles (bulk) or replace the particles, insertion and release of Li in accordance with oxidation-reduction of Ni or Mn in the bulk are not inhibited; therefore, a high capacity can be obtained.

According to this embodiment, due to the presence of a coating layer, elution of a transition metal ($Mn^{4+}$, $Ni^{2+}$) and release of oxygen from the crystal structure on a surface layer can be suppressed. Furthermore, by forming a (metal-Li) compound on an interface of coating layer—solid solution positive electrode active material (having a region in which a metal element is existed on an active material side), an improvement in Li diffusion property (Li conductivity) can be achieved. As a result, not only interface resistance is lowered but also the Li diffusion resistance within a particle can be reduced. According to such lowered resistance and improvement of Li diffusion property, the battery performance (capacity, rate characteristics, and cycle characteristics) can be improved. Furthermore, as elution of a transition metal is suppressed, not only a reaction between a solid solution active material (particle) surface layer and an electrolyte solution can be suppressed but also a decrease in average voltage which occurs according to progress of the cycle can be suppressed.

In the present embodiment, in order to confirm that the side of the solid solution positive electrode active material in the interface between the solid solution positive electrode active material particles and the coating layer has a region in which the metal element for forming the coating layer is present, presence of a metal element on the surface layer of the active material particles can be determined qualitatively by using a high-resolution measuring device. Examples of an analysis device (analysis method) include XPS (X ray photoelectron spectroscopy), TEM-EDX (transmission electron microscope-energy dispersive X ray spectroscopy), STEM-EDX/EELS (scanning transmission electron microscope-energy dispersive X ray spectroscopy/electron energy loss spectroscope), and HAADF-STEM (high-angle scattering dark field-scanning transmission electron microscope image).

Meanwhile, the thickness (average thickness) of the coating layer is not particularly limited, but from the viewpoint of improving the aforementioned characteristics of solid solution positive electrode active material, it is preferably 2 to 20 nm. With regard to the method for measuring the average thickness of the coating layer, it can be performed by using an image observed under SEM or TEM, for example. In addition to these methods, it is also possible that the average particle diameter of the solid solution active material and the average particle diameter of the positive electrode active material formed with an alumina layer are measured by using a particle size distribution measuring device of a laser diffraction•scattering method, and a difference therebetween may be used as the average thickness of the alumina layer.

Furthermore, the presence ratio of the coating layer on the surface of particles of the solid solution positive electrode active material is not particularly limited, and it is most preferably 100% by area; however, from the viewpoint of exhibiting the effect of the present embodiment, it is sufficient that the presence ratio is 20% by area or more, and preferably 50% by area or more.

The solid solution positive electrode active material having a coating layer as described above can be prepared, for example, by a method which includes a step of coating metal oxide on a surface of the solid solution active material which is represented by the following Formula (1): $Li_{1.5}[Ni_aMn_b Co_c[Li]_d[X]_e]O_z$ (in the formula, X is at least one member selected from the group consisting of Ti, Zr, and Nb, $0 \le e \le 0.5$, $a+b+c+d+e=1.5$, $0.1 \le d \le 0.4$, and $1.1 \le [a+b+c+e] \le 1.4$, and z represents an oxygen number for satisfying the atomic valence). At that time, the step of coating the surface of the solid solution active material with metal oxide may include a step of mixing the solid solution active material with a solution of a salt of metal element (such as nitrate salt (for example, aluminum nitrate or the like as a salt of aluminum), carbonate salt (for example, ammonium zirconium carbonate as a carbonate of zirconium), and metal alkoxide (tetraisopropoxy titan as metal alkoxide of titan)) which forms the coating layer at pH of 7 to 8, a step of drying the solid solution active material precursor obtained therefrom, and a step of calcining the solid solution active material precursor after drying obtained therefrom at a temperature of 450° C.±50° C. The coating layer formed in a part or the whole of the surface of particles of the solid solution active material through these steps preferably has high mobility of Li ions, and preferably has a high effect of suppressing the elution of the transition metal. Furthermore, by performing a precipitation reaction of metal hydroxide at pH of 7 to 8 and setting the calcination temperature to 450° C.±50° C., preferably 420° C. to 480° C., the coating layer can be present in a part or the whole (20 to 100%) of the surface of particles of the solid solution active material. Furthermore, a solid solution active material in which a metal element has invaded the surface layer of particles of the solid solution active material can be produced. As a result, a battery having excellent performance and durability can be provided. Hereinafter, each step will be described with an example in which the coating layer is formed of alumina.

First, the solid solution active material is mixed with an aluminum nitrate solution at pH of 7 to 8. The solid solution active material precursor can be thereby obtained.

As a raw material of aluminum, aluminum nitrate is preferable. This is because a nitrate ion can be decomposed and removed in the calcination step and a battery using this positive electrode active material has thereby excellent performance. When aluminum sulfate or aluminum chloride is used, a sulfate ion or a chloride ion remains, a battery using such positive electrode active material has lower performance. Aluminum acetate is not suitable for the present method (precipitation reaction).

It is only required to appropriately adjust the blending amount of aluminum nitrate as a raw material of aluminum ($Al_2O_3$ layer) so as to be the aforementioned content of $Al_2O_3$ of the positive electrode active material.

In this step, a precipitant is further used. As the precipitant, ammonium water is preferable. This is because an ammonium ion can be decomposed and removed in the calcination step and a battery using this positive electrode active material has thereby excellent performance. When sodium hydroxide is used, Na remains as impurities of such positive electrode active material, a battery using the positive electrode active material has lower performance.

When the pH at the time of mixing of the solid solution active material, the aluminum nitrate solution, and ammonium water as a precipitant is less than pH of 7, the reaction between aluminum nitrate and ammonium water is not performed sufficiently, aluminum hydroxide is precipitated poorly, and thus a desired coat amount cannot be obtained with respect to the injection amount. On the other hand, when the pH is more than 8, aluminum hydroxide is dissolved again, and a desired coat amount cannot be obtained with respect to the injection amount.

The mixing temperature and mixing time are not particularly limited as long as the reaction between aluminum nitrate and ammonium water is performed sufficiently and a desired solid solution active material precursor (the solid solution active material on the surface of which aluminum hydroxide is precipitated) is formed by the mixing operation. As a guideline, the mixing temperature (solution temperature of the reaction system) can be 20 to 50° C., and the mixing time can be 30 minutes to 3 hours. After mixing, the resulting solid solution active material precursor may be soaked in the solution for about 3 hours or less. Accordingly, a suitable coat of an alumina layer can be formed so that the effect of improving charge and discharge characteristics and cycle durability is obtained. Furthermore, a mixing means (device) is not particularly limited, and a known mixing and stirring means (device) can be used.

Subsequently, the solid solution active material precursor obtained in the above is dried. First, the solid solution active material precursor is filtered from the mixed solution. A filtering means (device) is not particularly limited, and a known filtering means (device) can be used.

Subsequently, the filtered solid solution active material precursor is dried. Drying conditions are not particularly limited as long as the solid solution active material precursor can be dried sufficiently. That is, when the steps from drying to calcination are performed continuously, the drying step may not be distinguished from the calcination step strictly, and this is because the steps from drying to calcination may be performed at predetermined calcination temperature. From the above, as the drying conditions, the drying temperature can be in the range of 80 to 200° C., and the drying time can be in the range of 30 minutes to 12 hours, preferably 1 to 6 hours. In addition, an atmosphere during drying is not particularly limited, and it can be performed in the air atmosphere or the like. Furthermore, a drying method (device) is not particularly limited, and a known drying method (device) can be used. Specifically, for example, it is possible to use vacuum drying, hot air drying, infrared (IR) drying, and natural drying appropriately in combination thereof.

Furthermore, the solid solution active material precursor dried above is calcined at a temperature of 450° C.±50° C. As the calcination conditions of the solid solution active material precursor, by being a calcination temperature range of 450° C.±50°, preferably 420° C. to 480° C., for 1 to 12 hours, preferably 2 to 6 hours, the $Al_2O_3$ layer can be present in a part or the whole of the surface of particles of the solid solution active material. Furthermore, the solid solution active material in which Al element has invaded the surface layer of particles of the solid solution active material can be prepared. When the calcination temperature is lower than 400° C., decomposition of aluminum hydroxide is not sufficient, a desired $Al_2O_3$ coat layer cannot be formed, and a battery using this positive electrode active material has poor durability. On the other hand, when the calcination temperature is higher than 500° C., the $Al_2O_3$ layer becomes dense, mobility of Li ions is lowered, and a battery using this positive electrode active material exhibits poor performance. Moreover, an atmosphere during calcination is not particularly limited, it can be performed in the air atmosphere or the like. Furthermore, a calcination means (device) is not particularly limited, a known calcination means (device) can be used.

A positive electrode active material other than the aforementioned solid solution positive electrode active material may be combined together according to circumstances. In that case, in view of a capacity and output performance, the lithium-transition metal composite oxide is preferably used for the positive electrode active material. Note that other positive electrode active materials not listed above can, of course, be used instead. In the case when the respective active materials require different particle diameters in order to achieve their own appropriate effects, the active materials having different particle diameters may be selected and blended together so as to optimally function to achieve their own effects. Thus, it is not necessary to have uniform particle diameter of all of the active materials.

An average particle diameter of the positive electrode active material contained in the positive electrode active material layer 13 is not particularly limited; however, in view of higher output performance, the average particle diameter is preferably in the range from 1 μm to 30 μm, more preferably in the range from 5 μm to 20 μm. Note that, in the present specification, "the particle diameter" represents the maximum length between any two points on the circumference of the active material particle (the observed plane) observed by observation means such as a scanning electron microscope (SEM) and a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may also be determined in the same manner.

As described above, the positive electrode active material layer contains a positive electrode active material (solid solution positive electrode active material) which is represented by the following formula (2).

[Mathematical formula 8]

$$e \text{ (solid solution positive electrode active material)} \quad (2)$$

In the formula (2), e indicates % by weight of each component in the positive electrode active material layer, and it satisfies $80 \leq e \leq 98$.

As is evident from the formula (2), it is essential that the content of the solid solution positive electrode active material in the positive electrode active material layer is 80 to 98% by weight. However, it is preferably 84 to 98% by weight.

Furthermore, it is preferable that, in addition to the solid solution positive electrode active material layer described above, a binder and a conductive aid are contained in the positive electrode active material layer. Furthermore, if necessary, it may contain other additives including an electrolyte (for example, polymer matrix, ion conductive polymer, and electrolyte solution) and lithium salt for increasing ion conductivity.

(Binder)

The binder used in the positive electrode active material layer is not particularly limited. Examples of the binder include: a thermoplastic polymer such as polyethylene, polypropylene, polyethylene terephthalate (PET), polyethernitrile, polyacrylonitrile, polyimide, polyamide, cellulose, carboxymethyl cellulose (CMC) and a salt thereof, an ethylene-vinyl acetate copolymer, polyvinyl chloride, styrene butadiene rubber (SBR), isoprene rubber, butadiene rubber, ethylene propylene rubber, an ethylene propylene diene copolymer, a styrene-butadiene-styrene block copolymer and a hydrogen additive thereof, and a styrene-isoprene-styrene block copolymer and a hydrogen additive thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber), and vinylidene fluoride-chlorotrifluoroethylene fluoro rubber (VDF-CTFE fluoro rubber); and an epoxy resin. These binders may be used either singly or in combination of two or more types.

Content of the binder contained in the positive electrode active material layer is preferably 1 to 10% by weight, and more preferably 1 to 8% by weight.

(Conductive Aid)

The conductive aid is an additive to be mixed for improving conductivity of the positive electrode active material layer or negative electrode active material layer. Examples of the conductive aid include carbon black like Ketjen black and acetylene black. If the active material layer contains a conductive aid, the electron network in the inside of the active material layer is effectively formed, thereby contributing to the improvement of output property of a battery.

Content of the conductive aid in the positive electrode active material layer is preferably 1 to 10% by weight, and more preferably 1 to 8% by weight. As the blending ratio (content) of the conductive aid is defined in the aforementioned range, the following effects are exhibited. Namely, as the electron conductivity is sufficiently ensured without inhibiting an electrode reaction, a decrease in energy density caused by decreased electrode density can be suppressed, and also an increase in energy density based on improved electrode density can be obtained.

(Other Components)

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conducting polymer include a polyethylene oxide (PEO)-based polymer and a polypropylene oxide (PPO)-based polymer.

The positive electrode (positive electrode active material layer) may be formed by a method of applying (coating) ordinary slurry thereto, or by any of a kneading method, a sputtering method, a vapor deposition method, a CVD method, a PVD method, an ion plating method, and a thermal spraying method.

[Negative Electrode Active Material Layer]

The negative electrode active material layer 15 essentially contains, as a negative electrode active material, a Si-containing alloy and a carbon material.

(Si-containing Alloy)

The Si-containing alloy is not particularly limited as long as it is an alloy with other metal containing Si, and reference can be suitably made to public knowledge of a related art. Herein, preferred examples of the Si-containing alloy include $Si_xTi_yGe_zA_a$, $Si_xTi_yZn_zA_a$, $Si_xTi_ySn_zA_a$, $Si_xSn_yAl_zA_a$, $Si_xSn_yV_zA_a$, $Si_xSn_yC_zA_a$, $Si_xZn_yV_zA_a$, $Si_xZn_ySn_zA_a$, $Si_xZn_yAl_zA_a$, $Si_xZn_yC_zA_a$, $Si_xAl_yC_zA_a$, and $Si_xAl_yNb_zA_a$ (in the formulae, A indicates an inevitable impurity, x, y, z and a represent values of % by weight and satisfy the conditions of $0<x<100$, $0<y<100$, $0<z<100$, $0 \leq a<0.5$, and $x+y+z+a=100$). By using those Si-containing alloys for the negative electrode active material and suitably selecting a predetermined first addition element and a predetermined second addition element, amorphous-crystal phase transition at the time of the alloying with Li can be suppressed so that the cycle lifetime can be extended. In addition, the negative electrode active material thus obtained has a higher capacity than conventional negative electrode active materials such as carbon-based negative electrode active materials.

It is sufficient that the average particle diameter of the Si-containing alloy is at the same level as the average particle diameter of the negative electrode active material to be contained in the negative electrode active material 15 of a related art, and it is not particularly limited. From the viewpoint of having high output, it is preferably in the range of 1 to 20 μm. However, it is never limited to the above range, and it is needless to say that it can be outside the above range as long as the working effect of this embodiment is effectively exhibited. Furthermore, the shape of the Si-containing alloy is not particularly limited, and examples thereof include a spherical shape, an elliptical shape, a column shape, a polygonal column shape, a flake shape, and an amorphous shape.

(Carbon Material)

The carbon material which may be used in the present invention is not particularly limited, and examples thereof include graphite, which is highly crystalline carbon, such as natural graphite or artificial graphite; low crystalline carbon such as soft carbon or hard carbon; carbon black such as Ketjen black, acetylene black, channel black, lamp black, oil furnace black, or thermal black; and a carbon material such as fullerene, carbon nanotube, carbon nanofiber, carbon nanohorn, or carbon fibril. Among them, it is preferable to use graphite.

According to this embodiment, as the carbon material is used as a negative electrode active material in combination with the above Si-containing alloy, high initial capacity can be obtained while maintaining higher cycle property and rate property, and thus balanced properties can be exhibited.

Furthermore, the average particle diameter of the carbon material is, although not particularly limited, preferably 5 to 25 μm, and more preferably 5 to 10 μm. Compared to the average particle diameter of the Si-containing alloy described above, the average particle diameter of the carbon material may be the same or different from that of the Si-containing alloy, but it is preferably different from that of the Si-containing alloy. In particular, it is more preferable that the average particle diameter of the Si-containing alloy is smaller than the average particle diameter of the carbon material. If the average particle diameter of the carbon material is relatively larger than the average particle diameter of the Si-containing alloy, it is possible to have a structure in which particles of the carbon material are evenly arranged and the Si-containing alloy is present among the particles of the carbon material, and thus the Si-containing alloy can be evenly arranged within the negative electrode active material layer.

According to circumstances, a negative electrode active material other than the two kinds of a negative electrode active material described above may be used in combination. Examples of the negative electrode active material which may be used in combination include $SiO_x$, a lithium-transition metal composite oxide (for example, $Li_4T_5O_{12}$), a metal material, and a lithium alloy-based negative electrode material. It is needless to say that a negative electrode active material other than those can be also used.

The negative electrode active material layer contains a negative electrode active material represented by the following formula (1).

[Mathematical formula 9]

$$\alpha(\text{Si-containing alloy}) + \beta(\text{carbon material}) \quad (1)$$

In the formula (1), $\alpha$ and $\beta$ indicate % by weight of each component in the negative electrode active material layer, and they satisfy $80 \leq \alpha + \beta \leq 98$, $3 \leq \alpha \leq 40$, and $40 \leq \beta \leq 95$.

As it is evident from the formula (1), the content of the negative electrode active material including Si-containing alloy is 3 to 40% by weight in the negative electrode active material layer. Furthermore, the content of the carbon material negative electrode active material is 40 to 95% by weight. Furthermore, the total content thereof is 80 to 98% by weight.

Incidentally, the mixing ratio of Si-containing alloy and carbon material as a negative electrode active material is not particularly limited as long as it satisfies the content requirement described above, and it can be suitably selected depending on desired use or the like. In particular, the content of the Si-containing alloy in the negative electrode active material is preferably 3 to 40% by weight. According to one embodiment, the content of the Si-containing alloy in the negative electrode active material is more preferably 4 to 30% by weight. According to another embodiment, the content of the Si-containing alloy in the negative electrode active material is more preferably 5 to 20% by weight.

When the content of the Si-containing alloy is 3% by weight or more, high initial capacity is obtained, and therefore desirable. On the other hand, when the content of the Si-containing alloy is 40% by weight or less, high cycle property is obtained, and therefore desirable.

According to this embodiment, the negative electrode active material layer preferably contains a binder and a conductive aid in addition to the negative electrode active material which is described above. In addition, if necessary, it further contains other additives including an electrolyte (for example, polymer matrix, ion conductive polymer, and electrolyte solution) and lithium salt for increasing ion conductivity. As for the specific type or preferred content of those additives in the negative electrode active material layer, those descriptions given in the above for describing the positive electrode active material layer can be similarly adopted, and thus detailed descriptions are omitted herein.

This embodiment is characterized in that the coating amount (weight per unit area) of a negative electrode active material layer is 4 to 11 $mg/cm^2$. When the coating amount (weight per unit area) of a negative electrode active material layer is more than 11 $mg/cm^2$, there is a problem that the rate property of a battery is significantly impaired. On the other hand, when the coating amount (weight per unit area) of a negative electrode active material layer is less than 4 $mg/cm^2$, content of the active material per se is low in the negative electrode active material layer, and an excessive load needs to be applied to a negative electrode active material layer to ensure sufficient capacity so that the cycle durability is impaired. On the other hand, if the coating amount (weight per unit area) of a negative electrode active material layer is a value within the aforementioned range, both the rate property and cycle property can be obtained simultaneously. Furthermore, according to the invention, the coating amount (weight per unit area) within the aforementioned can be achieved since a predetermined negative electrode active material layer is used in combination with adjusted content.

The thickness of each active material layer (active material layer on a single surface of a current collector) is not particularly limited either, and reference can be made to the already-known knowledge about a battery. For example, the thickness of each active material layer is generally about 1 to 500 μm, and preferably about 2 to 100 μm, considering the purpose of use (for example, focused on output or focused on energy, etc.), ion conductivity, or the like of a battery.

<Current Collector>

The current collector (11, 12) is made of an electrically conductive material. The size of the respective current collector may be determined depending on the intended use of the battery. For example, a current collector having a large area is used for a large size battery for which high energy density is required.

The thickness of the current collector is not particularly limited, either. The thickness of the current collector is generally about 1 μm to 100 μm.

The shape of the respective current collector is not particularly limited, either. The laminate type battery 10 shown in FIG. 1 may use, in addition to a current collecting foil, a mesh-shaped current collector (such as an expanded grid) or the like.

Meanwhile, a current collecting foil is preferably used when a thin film alloy as the negative electrode active material is directly formed on the negative electrode current collector 12 by a sputtering method.

The material forming the current collector is not particularly limited. For example, a metal or resin in which electrically conductive filler is added to an electrically conductive polymer material or a non-electrically conductive polymer material may be used.

Specific examples of the metal include aluminum, nickel, iron, stainless steel, titanium and copper. In addition, a clad metal of nickel and aluminum, a clad metal of copper and aluminum, or an alloyed material of these metals combined together, may be preferably used. A foil in which a metal surface is covered with aluminum may also be used. In particular, aluminum, stainless steel, copper and nickel are preferable in view of electron conductivity, battery action potential, and adhesion of the negative electrode active material to a current collector by sputtering.

Examples of the electrically conductive polymer material include polyaniline, polypyrrole, polythiophene, polyacetylene, polyparaphenylene, polyphenylene vinylene, polyacrylonitrile, and polyoxadiazole. These electrically conductive polymer materials have the advantage in simplification of the manufacturing process and lightness of the current collector, as they have sufficient electric conductivity even if an electrically conductive filler is not added thereto.

Examples of the non-electrically conductive polymer material include polyethylene (PE; such as high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). These non-electrically conductive polymer materials have high potential resistance or solvent resistance.

The above electrically conductive polymer material or the non-electrically conductive polymer material may include electrically conductive filler that is added as necessary. In particular, when the resin serving as a substrate of the current collector consists only of a non-electrically conductive polymer, the electrically conductive filler is essential to impart electric conductivity to the resin.

The electrically conductive filler is not particularly limited as long as it is a substance having electric conductivity. Examples of the material having high electric conductivity, potential resistance or lithium ion insulation characteristics, include metal and electrically conductive carbon. The metal is not particularly limited; however, the metal is preferably at least one element selected from the group consisting of Ni, Ti, Al, Cu, Pt, Fe, Cr, Sn, Zn, In, Sb, and K, or an alloy or metal oxide containing these metals. The electrically conductive carbon is not particularly limited; however, the electrically conductive carbon is preferably at least one material selected from the group consisting of acetylene black, Vulcan, Black Pearl, carbon nanofiber, Ketjen black, carbon nanotube, carbon nanohorn, carbon nanoballoon, and fullerene.

The addition amount of the electrically conductive filler is not particularly limited as long as it imparts sufficient electric conductivity to the current collectors. In general, the amount thereof is approximately 5 to 35% by weight.

<Separator (Electrolyte Layer)>

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven separator including a polymer or a fiber which absorbs and maintains the electrolyte.

As a porous sheet separator including a polymer or a fiber, a microporous (microporous membrane) separator can be used, for example. Specific examples of the porous sheet including a polymer or a fiber include a microporous (microporous membrane) separator which is comprised of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylidene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a monolayer or a multilayer. Fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Furthermore, the volume density of a non-woven fabric is not particularly limited as long as sufficient battery characteristics are obtained with an impregnated electrolyte. Furthermore, it is sufficient that the thickness of the non-woven separator is the same as that of an electrolyte layer. Preferably, it is 5 to 200 µm. Particularly preferably, it is 10 to 100 µm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethyl methyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1, 2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) containing an ion conductive polymer. Use of a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylronitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator laminated with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing an impaired performance as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

Content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer is increased so that vibration resistance of a separator can be enhanced. On the other hand, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

<Current Collecting Plate (Tab)>

In the lithium ion secondary battery, a current collecting plate (tab) that is electrically connected to the current collector is taken out of the laminate film as an outer casing material for the purpose of drawing the current to the outside of the battery.

The material constituting the current collecting plate is not particularly limited and a known highly electrical conducting material which is used in the related art as a current collecting plate for lithium ion secondary battery may be used. Preferred examples of the constituent material of the current collecting plate may include a metal material such as aluminum, copper, titanium, nickel, stainless steel (SUS) and an alloy thereof. The material is more preferably aluminum and copper and particularly preferably aluminum from the viewpoint of lightweight, corrosion resistance and high electrical conductivity. Meanwhile, the same material or different materials may be used in the positive electrode current collecting plate (positive electrode tab) and the negative electrode current collecting plate (negative electrode tab).

Figure 2:
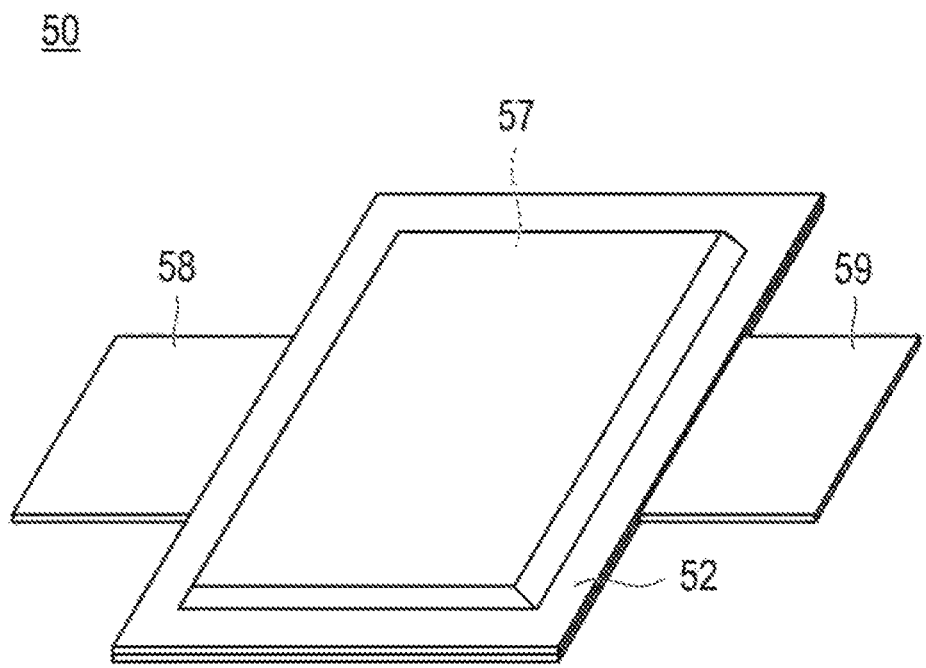
FIG. 2 is a perspective view illustrating an appearance of a flat lithium ion secondary battery, which is a typical embodiment of the electrical device according to the present invention.

The exposed state of the tabs 58 and 59 shown in FIG. 2 is not particularly limited. The positive electrode tab 58 and the negative electrode tab 59 may be taken out from the same side. Alternatively, the positive electrode tab 58 and the negative electrode tab 59 may each be divided into several pieces to be taken out separately from each side. Thus, the current collecting plates are not limited to the configuration shown in FIG. 2. In the wound lithium ion battery, a terminal may be formed by use of, for example, a cylinder can (metal can) in place of the tab.

<Seal Portion>

The seal portion is a unique member for the series laminate type battery and has a function to prevent the leakage of electrolyte layer. Furthermore, it is also possible to prevent the contact between adjacent current collectors in the battery or the short circuit caused by slight lack of uniformity of the ends of the laminated electrodes.

The constituting material for the seal portion is not particularly limited and a polyolefin resin such as polyethylene and polypropylene, an epoxy resin, rubber, polyimide and the like may be used. Among these, it is preferable to use a polyolefin resin from the viewpoint of corrosion resistance, chemical resistance, film forming property, economic efficiency and the like.

<Positive Electrode Terminal Lead and Negative Electrode Terminal Lead>

A known lead used in a laminate type secondary battery can be used as the material of the negative electrode and positive electrode terminal leads. Meanwhile, it is preferable to cover the part taken out from the outer casing material for battery with a thermal shrinkable tube exhibiting heat resistance and insulation so as not to affect the product (for example, automobile parts and especially electronic devices) by contact with a peripheral device or a wire causing the leakage of electricity.

<Outer Casing Material; Laminate Film>

As the outer casing material, it is possible to use a metal can case known in the related art. In addition, it is also possible to pack the power generating element 21 using the laminate film 29 illustrated in FIG. 1 as the outer casing material. The laminate film may be configured as a three-layer structure formed by laminating, for example, polypropylene, aluminum and nylon in this order. The use of such a laminate film makes it possible to easily perform opening of the outer casing material, addition of a capacity recovery material, and resealing of the outer casing material.

<Method for Producing Lithium Ion Secondary Battery>

The method for producing a lithium ion secondary battery is not particularly limited, and it may be produced by a known method. Specifically, the method includes (1) fabrication of the electrodes, (2) fabrication of the single battery layer, (3) fabrication of the power generating element, and (4) production of the laminate type battery. Hereinafter, the method for producing a lithium ion secondary battery will be described by taking an example but is not limited thereto.

(1) Fabrication of Electrode (Positive Electrode and Negative Electrode)

The electrode (positive electrode or negative electrode) may be fabricated, for example, by preparing an active material slurry (positive electrode active material slurry or negative electrode active material slurry), coating the active material slurry on a current collector, and drying and then pressing the resultant. The active material slurry contains the active material (positive electrode active material or negative electrode active material) described above, a binder, a conductive aid, and a solvent.

The solvent is not particularly limited, and N-methyl-2-pyrrolidone (NMP), dimethyl formamide, dimethyl acetamide, methyl formamide, cyclohexane, hexane, water and the like may be used.

The method for coating the active material slurry on the current collector is not particularly limited, and examples thereof may include a screen printing method, a spray coating method, an electrostatic spray coating method, an ink jet method, and a doctor blade method.

The method for drying the coating film formed on the surface of the current collector is not particularly limited as long as at least apart of the solvent in the coating film is removed. Examples of the drying method may include heating. The drying conditions (drying time, drying temperature and the like) may be appropriately set depending on the volatilization rate of the solvent contained in the active material slurry to be applied, the coating amount of the active material slurry and the like. Incidentally, a part of the solvent may remain. The remained solvent may be removed in the pressing process or the like to be described below.

The pressing means is not particularly limited, and for example, a calendar roll, a flat press and the like may be used.

(2) Fabrication of Single Battery Layer

The single battery layer may be fabricated by laminating the electrodes (positive electrode and negative electrode) fabricated in (1) via an electrolyte layer.

(3) Fabrication of Power Generating Element

The power generating element may be fabricated by laminating the single battery layers in appropriate consideration of the output and capacity of the single battery layer, and the output, capacity and the like that are required for a battery.

(4) Production of Laminate Type Battery

As the configuration of the battery, it is possible to employ various kinds of shapes such as a square shape, a paper type, a laminate type, a cylindrical type and a coin type. In addition, the current collector, an insulating plate and the like of the constituent components are not particularly limited and may be selected according to the above shape. However, a laminate type cell is preferred in this embodiment. In the laminate type battery, the lead is joined to the current collector of the power generating element obtained above and this positive electrode lead or negative electrode lead is joined to the positive electrode tab or the negative electrode tab. Thereafter, the power generating element is introduced into the laminate sheet such that the positive electrode tab and the negative electrode tab are exposed to the outside of the battery, the electrolyte solution is injected by a injecting machine, and the laminate sheet is sealed in a vacuum, such that the laminate type battery can be produced.

(5) Activation Treatment or the Like

In the present embodiment, it is preferable to further perform an initial charge treatment, a gas removing treatment, and an activation treatment under the following conditions from a viewpoint of improving performance and durability of the laminate type battery obtained above (refer to Example 1). In this case, in order to be able to perform the gas removing treatment, in the above (4) Production of laminate type battery, three sides of the laminate sheet (outer casing material) are completely sealed (main sealing) at the time of sealing by thermocompression bonding into a rectangular shape, and the remaining one side is temporarily sealed by thermocompression bonding. The remaining one side, for example, may be freely opened or closed by clipping or the like. However, it is preferable to temporarily seal the one side by thermocompression bonding from the viewpoint of mass production (production efficiency). This is because this case only requires adjusting the temperature and the pressure for bonding. When the side is temporarily sealed by thermocompression bonding, the side can be unsealed by applying a slight pressure. After degassing, the side may be temporarily sealed again by thermocompression bonding. Finally, the side can be completely sealed (main sealing) by thermocompression bonding.

(Initial Charge Treatment)

It is desirable to perform an aging treatment of the battery as follows. Charging is performed at 25° C. at 0.05 C for 4 hours (SOC: about 20%) by a constant current charging method. Subsequently, the battery is charged at 25° C. with rate of 0.1 C to 4.45 V. Thereafter, charging is stopped, and the battery is allowed to stand in the state (SOC: about 70%) about for two days (48 hours).

(Initial (First) Gas Removing Treatment)

Next, as the initial (first) gas removing treatment, the following treatment is performed. First, the one side temporarily sealed by thermocompression bonding is unsealed. Gas is removed at 10±3 hPa for five minutes. Thereafter, the one side is subjected to thermocompression bonding again to perform temporary sealing. In addition, pressure molding (contact pressure: 0.5±0.1 MPa) is performed using a roller to make the electrode adhere to the separator sufficiently.

(Activation Treatment)

Next, as the activation treatment method, the following electrochemical pretreatment method is performed.

First, two cycles of charging at 25° C. at 0.1 C until the voltage becomes 4.45 V by a constant current charging method and thereafter, discharging at 0.1 C to 2.0 V, are performed. Similarly, one cycle of charging at 25° C. at 0.1 C until the voltage becomes 4.55 V by a constant current charging method, and then discharging at 0.1 C to 2.0 V, and one cycle of charging at 0.1 C until the voltage becomes 4.65 V and thereafter, discharging at 0.1 C to 2.0 V, are performed. Furthermore, one cycle of charging at 25° C. at 0.1 C until the voltage becomes 4.75 V by a constant current charging method and then discharging at 0.1 C to 2.0 V, can be performed.

Here, as the activation treatment method, an electrochemical pretreatment method in which the constant current charging method is used and the voltage is used as a stop condition has been described as an example. However, as the charging method, a constant current constant voltage charging method may be used. In addition to the voltage, a charge amount or time may be employed as the stop condition.

(Last (Second) Gas Removing Treatment)

Next, as the last (second) gas removing treatment, the following treatment is performed. First, the one side temporarily sealed by thermocompression bonding is unsealed. Gas is removed at 10±3 hPa for five minutes. Thereafter, the one side is subjected to thermocompression bonding again to perform main sealing. In addition, pressure molding (contact pressure: 0.5±0.1 MPa) is performed using a roller to make the electrode adhere to the separator sufficiently.

In the present embodiment, it is possible to enhance performance and durability of the obtained battery by performing the above-described initial charge treatment, gas removing treatment, and activation treatment.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small size assembled battery by connecting plural batteries in series or in parallel. Furthermore, by connecting again plural detachable small size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small size assembled battery for fabricating an assembled battery with high capacity can be determined depending on the capacity or output of a battery of a vehicle (electric vehicle) for which the battery is loaded.

[Vehicle]

The lithium ion secondary battery according to the present embodiment can maintain discharge capacity even when it is used for a long period of time, and thus has good cycle characteristics. It also has high volume energy density. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the lithium ion secondary battery (electrical device) can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Hereinbelow, more detailed descriptions are given in view of Examples and Comparative Examples, but the present invention is not limited to the Examples given below.

Example 1

Preparation of Solid Solution Positive Electrode Active Material C1

1. To 200 g of pure water was added 28.61 g of manganese sulphate monohydrate (molecular weight of 223.06 g/mol) and 17.74 g of nickel sulfate hexahydrate (molecular weight of 262.85 g/mol), and the resulting mixture was stirred and dissolved to prepare a mixed solution.

2. Subsequently, ammonia water was dropwise added to the mixed solution until the pH became 7, $Na_2CO_3$ solution was further dropwise added thereto, and a composite carbonate was precipitated (the pH was maintained at 7 with ammonia water while the $Na_2CO_3$ solution was dropwise added).

3. Thereafter, the precipitate was subjected to suction filtration, further washed with water sufficiently, and then dried at 120° C. for 5 hours in a dry oven.

4. The dry powder was pulverized with a mortar and pestle, and then subjected to temporary calcination at 500° C. for 5 hours.

5. With the powder subjected to temporary calcination, 10.67 g of lithium hydroxide monohydrate (molecular weight of 41.96 g/mol) was mixed, and the resulting mixture was pulverized and mixed for 30 minutes.

6. This powder was subjected to temporary calcination at 500° C. for 2 hours, and then subjected to calcination at 900° C. for 12 hours to obtain solid solution positive electrode active material C1.

The composition of solid solution positive electrode active material C1 obtained in this way was as follows.

Composition: C1 $Li_{1.5}[Ni_{0.45}Mn_{0.85}[Li]_{0.20}]O_3$

When this composition of the solid solution positive electrode active material C1 is applied to Formula (3), a+b+c+d=1.5, d=0.20, a+b+c=1.3, and z; the number of oxygen atoms for satisfying an atomic valence, thus meeting the requirement of Formula (3).

($Al_2O_3$ Coating onto Surface of Solid Solution Positive Electrode Active Material C1)

1. To 100 g of pure water were added 10.0 g of solid solution positive electrode active material C1 obtained in the above "Preparation of solid solution positive electrode active material C1" and 0.37 g of aluminum nitrate nonahydrate (molecular weight of 375.13 g/mol), and stirred and mixed to prepare a mixed solution.

2. Subsequently, 5% ammonia water was dropwise added to this mixed solution gradually while the mixed solution was stirred until the pH became 7 to 8, and aluminum hydroxide was precipitated on the surface of the particles of solid solution positive electrode active material C1. Stirring and mixing were further continued for 5 hours.

3. Thereafter, the precipitate was subjected to suction filtration and washed with water sufficiently, and then was dried at 100° C. for 1 hour in a dry oven.

4. The dry powder was pulverized with a mortar and pestle, and then subjected to temporary calcination at 450° C. for 5 hours to obtain solid solution positive electrode active material C1.

The solid solution positive electrode active material C1 obtained in this way was powder in which a coating layer made of 0.5% by weight of $Al_2O_3$ relative to the total amount of the solid solution positive electrode active material C1 (100% by weight) was formed on the surface of particles of solid solution positive electrode active material C1 obtained in the above "Preparation of solid solution positive electrode active material C1". The average particle diameter of obtained solid solution positive electrode active material C1 was 8 μm. The average particle diameters of the solid solution positive electrode active materials obtained in other Examples and Comparative Examples were the same as that particle diameter.

(Fabrication of Positive Electrode C1 Having Positive Electrode Active Material Layer Formed on Single Surface of Current Collector)

(Composition of Slurry for Positive Electrode)

The slurry for positive electrode had the following composition.

Positive electrode active material: $Al_2O_3$ coated solid solution positive electrode active material C1 obtained from above 9.4 parts by weight
Conductive aid:
 Flaky graphite 0.15 part by weight
 Acetylene black 0.15 part by weight
Binder: Polyvinylidene fluoride (PVDF) 0.3 part by weight
Solvent: N-methyl-2-pyrrolidone (NMP) 8.2 parts by weight.

When the above composition is applied to the formula (2), e=94 is obtained, and thus the requirement of the formula (2) is satisfied.

(Preparation of Slurry for Positive Electrode)

The slurry for a positive electrode having the above-described composition was prepared as follows. First, 2.0 parts by weight of a 20% binder solution in which a binder is dissolved in a solvent (NMP) and 4.0 parts by weight of the solvent (NMP) were added to a 50 ml disposable cup. The resulting mixture was stirred with a stirring deaerator (rotating and revolving mixer: Awatori Rentaro AR-100) for one minute to prepare a binder diluted solution. Subsequently, 0.4 part by weight of a conductive aid, 9.2 parts by weight of solid solution positive electrode active material C1, and 2.6 parts by weight of the solvent (NMP) were added to this binder diluted solution. The resulting mixture was stirred for 3 minutes using the stirring deaerator to obtain a slurry for a positive electrode (solid concentration: 55% by weight).

(Coating•Drying of Slurry for Positive Electrode)

One surface of aluminum current collector having a thickness of 20 μm was coated with the slurry for a positive electrode using an automatic coating device (doctor blade: PI-1210 automatic coating apparatus manufactured by Tester Sangyo Co., Ltd.). Subsequently, this current collector coated with the slurry for a positive electrode was dried using a hot plate (100° C. to 110° C., drying time: 30 minutes) to form a sheet-like positive electrode having a remaining NMP amount of 0.02% by weight or less in the positive electrode active material layer.

(Press of Positive Electrode)

The above sheet-like positive electrode was subjected to compression molding by applying a roller press, and cut to manufacture positive electrode having a weight of one surface of the positive electrode active material layer of about 17.1 mg/cm$^2$ and a density of 2.65 g/cm$^3$.

(Drying of Positive Electrode)

Subsequently, the positive electrode which was prepared according to the above procedures was dried in a vacuum drying furnace. The positive electrode was disposed in the drying furnace, and then the pressure was reduced (100 mmHg (1.33×10$^4$ Pa)) at room temperature (25° C.) to remove the air in the drying furnace. Subsequently, the temperature was raised to 120° C. at 10° C./min while nitrogen gas was circulated (100 cm$^3$/min), and the pressure was reduced again at 120° C. The positive electrode was allowed to stand for 12 hours while nitrogen in the furnace was discharged, and then the temperature was lowered to room temperature. Positive electrode C1 from the surface of which water had been removed was obtained in this way.

(Preparation of Negative Electrode A1 in which a Negative Electrode Active Material Layer is Formed on Single Surface of Current Collector)

As a Si-containing alloy which is a negative electrode active material, $Si_{29}Ti_{62}Ge_9$ was used. Meanwhile, the Si-containing alloy was prepared by a mechanical alloying method. Specifically, it was obtained in a manner such that a planetary ball mill P-6 (manufactured by Fritsch, Germany) was used, and zirconia pulverization balls and each raw material powder of the alloy was put into a zirconia pulverizing pot so as to subject the mixture to alloying processing at 600 rpm and for 48 hours.

Furthermore, because the Si-containing alloy ($Si_{29}Ti_{62}Ge_9$) prepared above and other alloys which may be used in the present invention (those of $Si_xTi_yGe_zA_a$, $Si_x$ $Ti_yZn_zA_a$, and $Si_xTi_ySn_zA$, except $Si_{29}Ti_{62}Ge_9$) have the same characteristics as $Si_{29}Ti_{62}Ge_9$, the same or similar results are obtained as the present example in which $Si_{29}Ti_{62}Ge_9$ is used.

(Composition of Slurry for Negative Electrode)

The slurry for a negative electrode had the following composition.

Negative Electrode Active Material:
Si-containing alloy ($Si_{29}Ti_{62}Ge_9$) 1.38 parts by weight
Carbon material (manufactured by Hitachi Chemical Company, Ltd., graphite) 7.82 parts by weight
Conductive aid: SuperP 0.40 part by weight
Binder: polyimide 0.40 part by weight
Solvent: N-methyl-2-pyrrolidone (NMP) 10.0 parts by weight.

When the above composition is applied to the formula (1), $\alpha+\beta=92.0$, $\alpha=2.8$, and $\beta=78.2$ are obtained, and thus the requirement of the formula (1) is satisfied. Incidentally, the average particle diameter of the carbon material was 22 μm and the average particle diameter of the Si-containing alloy was 0.3 μm.

(Production of Slurry for Negative Electrode)

The slurry for a negative electrode having the above-described composition was prepared as follows. First, 3.4 parts by weight of (NMP) was added to 2.0 parts by weight of a 20% binder solution in which a binder is dissolved in the solvent (NMP). The resulting mixture was stirred with a stirring deaerator for one minute to prepare a binder diluted solution. To this diluted binder solution, 0.4 part by weight of a conductive aid, 9.2 parts by weight of negative electrode active material powder, and 5.0 parts by weight of the solvent (NMP) were added. The resulting mixture was stirred for 3 minutes using the stirring deaerator to obtain a slurry for a negative electrode (solid concentration: 50% by weight).

(Coating•Drying of Slurry for Negative Electrode)

One surface of electrolytic copper current collector having a thickness of 10 μm was coated with the slurry for a negative electrode using an automatic coating device. Subsequently, this current collector coated with the slurry for a negative electrode was dried using a hot plate (100° C. to 110° C., drying time: 30 minutes) to form a sheet-like negative electrode having a remaining NMP amount of 0.02% by weight or less in the negative electrode active material layer.

(Press of Negative Electrode)

The obtained sheet-like negative electrode was subjected to compression molding by applying a roller press, and cut to manufacture negative electrode having a weight of one surface of the negative electrode active material layer of about 8.48 mg/cm² and a density of 1.60 g/cm³. When the surface of negative electrode was observed, an occurrence of crack was not observed.

(Drying of Electrode)

Subsequently, the negative electrode which was prepared according to the above procedure was dried in a vacuum drying furnace. The negative electrode was disposed in the drying furnace, and then the pressure was reduced (100 mmHg (1.33×10⁴ Pa)) at room temperature (25° C.) to remove the air in the drying furnace. Subsequently, the temperature was raised to 325° C. at 10° C./min while nitrogen gas was circulated (100 cm³/min), and the pressure was reduced again at 325° C. The negative electrode was allowed to stand for 24 hours while nitrogen in the furnace was discharged, and then the temperature was lowered to room temperature. Negative electrode A1 from the surface of which water had been removed was obtained in this way.

[Determination of Capacity of Positive Electrode C1]
[Fabrication of Coin Cell] The positive electrode C1 obtained as described above (punched to have diameter of 15 mm) was placed to face the counter electrode made of a lithium foil (manufactured by Honjo Metal Co., Ltd.; diameter: 16 mm; thickness: 200 μm) via a separator (diameter: 17 mm, Celgard 2400 manufactured by Celgard, LLC.), and an electrolyte solution was injected therein so as to prepare a CR2032 type coin cell.

Incidentally, the electrolyte solution used was prepared in a manner such that $LiPF_6$ (lithium hexafluorophosphate) was dissolved, at a concentration of 1 M, into a mixed non-aqueous solvent in which ethylene carbonate (EC) and diethyl carbonate (DEC) are mixed in a volume ratio of 1:1.

The activation treatment and performance evaluation were performed by use of a charging and discharging tester (HJ0501SM8A manufactured by Hokuto Denko Corporation) in a thermostat bath (PFU-3K manufactured by ESPEC Corp.) set at the temperature of 298 K (25° C.)

[Activation Treatment]

First, two cycles of charging at 0.1 C at 25° C. until the voltage becomes 4.45 V by a constant current charging method and thereafter, discharging at 0.1 C to 2.0 V, were performed. Similarly, one cycle of charging at 0.1 C at 25° C. until the voltage becomes 4.55 V by a constant current charging method, and then discharging at 0.1 C to 2.0 V, and one cycle of charging at 0.1 C until the voltage becomes 4.65 V and thereafter, discharging at 0.1 C to 2.0 V, were performed. Furthermore, one cycle of charging at 0.1 C at 25° C. until the voltage becomes 4.75 V by a constant current charging method and then discharging at 0.1 C to 2.0 V, was performed.

[Performance Evaluation]

With regard to the evaluation of battery, the charging was performed by a constant current and constant voltage charging method to charge the battery at rate of 0.1 C until the maximum voltage reached 4.5 V and then to retain for about 1 to 1.5 hours, and the discharging was performed by a constant current discharging method to discharge the battery at rate of 0.1 C until the minimum voltage of the battery reached 2.0 V. The discharge capacity at rate of 0.1 C was used as "0.1 C discharge capacity (mAh/g)".

As a result, it was found that the positive electrode C1 had discharge capacity per active material of 226 mAh/g and discharge capacity per unit electrode area of 3.61 mAh/cm².

[Determination of Capacity of Negative Electrode A1]
[Fabrication of Coin Cell]

The negative electrode A1 obtained as described above (punched to have diameter of 15 mm) was placed to face the counter electrode made of a lithium foil (manufactured by Honjo Metal Co., Ltd.; diameter: 16 mm; thickness: 200 μm) via a separator (diameter: 17 mm, Celgard 2400 manufactured by Celgard, LLC.), and an electrolyte solution was injected therein so as to prepare a CR2032 type coin cell.

Incidentally, the electrolyte solution used was prepared in a manner such that $LiPF_6$ (lithium hexafluorophosphate) was dissolved, at a concentration of 1 M, into a mixed non-aqueous solvent in which ethylene carbonate (EC) and diethyl carbonate (DEC) were mixed in a volume ratio of 1:1.

The performance evaluation were performed by use of a charging and discharging tester (HJ0501SM8A manufactured by Hokuto Denko Corporation) in a thermostat bath (PFU-3K manufactured by ESPEC Corp.) set at the temperature of 298 K (25° C.).

[Performance Evaluation]

With regard to the evaluation of battery, a constant current and constant voltage charging method in which the battery is charged at rate of 0.1 C from 2 V to 10 mV (the process of Li intercalation to the negative electrode as an evaluation subject) followed by maintaining for approximately 1 to 1.5 hours was performed. For the discharging process (the process of Li desorption from the negative electrode), a constant current mode was employed and a constant current discharging method in which the battery is charged at rate of 0.1 C from 10 mV to 2 V was performed. The discharge capacity at rate of 0.1 C was used as "0.1 C discharge capacity (mAh/g)".

As a result, it was found that the negative electrode A1 had discharge capacity per active material of 481 mAh/g and discharge capacity per unit electrode area of 4.08 mAh/cm$^2$.

[Fabrication of Laminate Cell]

Positive electrode C1 obtained above was cut so as to have an active material layer area with length 2.5 cm×width 2.0 cm. Uncoated surfaces (surfaces of aluminum current collecting foil, not coated with slurry) of these two pieces were stuck to each other such that the current collectors thereof face each other, and the current collector part was subjected to spot welding. A positive electrode having positive electrode active material layers, which are formed on both surfaces of the two-layered current collecting foil integrated by spot welding in the outer periphery thereof, was thereby formed. Thereafter, a positive electrode tab (positive electrode current collecting plate) of aluminum was welded to the current collector part to form positive electrode C11. That is, positive electrode C11 has the active material layers formed on both surfaces of the current collecting foil.

Meanwhile, the negative electrode A1 obtained above was cut so as to have an active material layer area with length 2.7 cm×width 2.2 cm. Thereafter, a negative electrode tab of electrolytic copper was welded to the current collector part to form negative electrode A11. That is, the negative electrode A11 has the active material layer formed on one surface of the current collector.

A five-layered laminate type power generating element was manufactured by sandwiching a separator (S) made of porous polypropylene (length 3.0 cm×width 2.5 cm, thickness 25 μm, porosity 55%) between these negative electrode A11 and positive electrode C11 to which tabs had been welded. The laminate type power generating element had a structure of negative electrode (one surface)/separator/positive electrode (both surfaces)/separator/negative electrode (one surface), that is, a structure in which A11-(S)-C11-(S)-A11 were laminated in this order. Subsequently, both sides thereof were sandwiched by a laminate film outer casing made of aluminum (length 3.5 cm×width 3.5 cm). Three sides thereof were sealed by thermocompression bonding to house the power generating element. Into this power generating element, 0.8 cm$^3$ (the above five-layered structure has a two-cell structure and an injection amount per cell was 0.4 cm$^3$) of an electrolyte solution was injected. Thereafter, the remaining one side was temporarily sealed by thermocompression bonding to manufacture a laminate type battery. In order to make the electrolyte solution go inside electrode pores sufficiently, the laminate type battery was allowed to stand at 25° C. for 24 hours while a contact pressure of 0.5 MPa was applied thereto.

Incidentally, the following material was used for preparing the electrolyte solution. First, 1.0 M of LiPF$_6$ (electrolyte) was dissolved in a mixed solvent of 30% by volume of ethylene carbonate (EC) and 70% by volume of diethyl carbonate (DEC). Thereafter, 1.8% by weight of lithium difluorophosphate (LiPO$_2$F$_2$) as lithium fluorophosphate acting as an additive and 1.5% by weight of methylene methane disulfonic acid (MMDS) were dissolved therein to be used as an electrolyte solution.

In the following Examples, an active material was prepared based on Example 1. Namely, except those that are specifically described below, an active material was prepared in the same manner as Example 1 described above.

(Solid Solution Positive Electrode Active Material C2)

The solid solution positive electrode active material C2 of Li$_{1.5}$[Ni$_{0.525}$Mn$_{0.825}$[Li]$_{0.15}$]O$_3$ was prepared. When the composition of the solid solution positive electrode active material C2 is applied to Formula (3), a+b+c+d=1.5, d=0.15, a+b+c=1.35, thus meeting the requirement of Formula (3). According to Example 1, the coating amount of a coating layer having Al$_2$O$_3$ was set at 0.5% by weight relative to the total amount of the solid solution positive electrode active material C2 coated with a coating layer (100% by weight).

(Solid Solution Positive Electrode Active Material C3)

The solid solution positive electrode active material C3 of Li$_{1.5}$[Ni$_{0.375}$Mn$_{0.875}$[Li]$_{0.25}$]O$_3$ was prepared. When the composition of the solid solution positive electrode active material C3 is applied to Formula (3), a+b+c+d=1.5, d=0.25, a+b+c=1.2, thus meeting the requirement of Formula (3). According to Example 1, the coating amount of a coating layer having Al$_2$O$_3$ was set at 0.5% by weight relative to the total amount of the solid solution positive electrode active material C3 coated with a coating layer (100% by weight).

(Solid Solution Positive Electrode Active Material C4)

The solid solution positive electrode active material C4 of Li$_{1.5}$[Ni$_{0.600}$Mn$_{0.800}$[Li]$_{0.10}$]O$_3$ was prepared. When the composition of the solid solution positive electrode active material C4 is applied to Formula (3), a+b+c+d=1.5, d=0.10, a+b+c=1.40, thus meeting the requirement of Formula (3). According to Example 1, the coating amount of a coating layer having Al$_2$O$_3$ was set at 0.5% by weight relative to the total amount of the solid solution positive electrode active material C4 coated with a coating layer (100% by weight).

(Solid Solution Positive Electrode Active Material C5)

The solid solution positive electrode active material C5 of Li$_{1.5}$[Ni$_{0.300}$Mn$_{0.900}$[Li]$_{0.30}$]O$_3$ was prepared. When the composition of the solid solution positive electrode active material C5 is applied to Formula (3), a+b+c+d=1.5, d=0.30, a+b+c=1.20, thus meeting the requirement of Formula (3). According to Example 1, the coating amount of a coating layer having Al$_2$O$_3$ was set at 0.5% by weight relative to the total amount of the solid solution positive electrode active material C5 coated with a coating layer (100% by weight).

(Solid Solution Positive Electrode Active Material C6)

The solid solution positive electrode active material C6 of Li$_{1.5}$[Ni$_{0.225}$Mn$_{0.925}$[Li]$_{0.35}$]O$_3$ was prepared. When the composition of the solid solution positive electrode active material C6 is applied to Formula (3), a+b+c+d=1.5, d=0.35, a+b+c=1.15, thus meeting the requirement of Formula (3). According to Example 1, the coating amount of a coating layer having Al$_2$O$_3$ was set at 0.5% by weight relative to the total amount of the solid solution positive electrode active material C6 coated with a coating layer (100% by weight).

(Solid Solution Positive Electrode Active Material C7)

According to Example 1, the solid solution positive electrode active material C1 before coating with metal oxide was prepared. Subsequently, it was coated with Al$_2$O$_3$ in the same manner as Example 1. At that time, the coating amount of a coating layer having Al$_2$O$_3$ was set at 2.0% by weight relative to the total amount of the solid solution positive electrode active material C7 coated with a coating layer (100% by weight).

(Solid Solution Positive Electrode Active Material C8)

According to Example 1, the solid solution positive electrode active material C1 before coating with metal oxide was prepared. Subsequently, by using ammonium zirconium carbonate $(Zr(OH)_2(CO_3)_2 \cdot 2NH_4$, molecular weight of 281.33 g/mol) instead of aluminum nitrate, a coating layer C2 to C10 to have discharge capacity of 3.61 mAh/cm², the coating amount was adjusted in consideration of the discharge capacity of the solid solution positive electrode active material and the composition of the positive electrode slurry. The composition of the obtained positive electrodes C1 to C10 and measured values of charge capacity and discharge capacity were summarized in the following Table 1.

TABLE 1

| Positive electrode | Composition | | | | | Coat | | Charge capacity mAh/g | Discharge capacity mAh/g | Coating amount mg/cm2 | Charge capacity mAh/cm2 | Discharge capacity mAh/cm2 |
|---|---|---|---|---|---|---|---|---|---|---|---|---|
| | Li | a | b | c | d | Oxide | wt % | | | | | |
| C1  | 1.500 | 0.450 | 0.850 | — | 0.200 | Al2O3 | 0.5 | 280 | 226 | 17.1 | 4.47 | 3.61 |
| C2  | 1.500 | 0.525 | 0.825 | — | 0.150 | Al2O3 | 0.5 | 279 | 225 | 17.2 | 4.47 | 3.61 |
| C3  | 1.500 | 0.375 | 0.875 | — | 0.250 | Al2O3 | 0.5 | 291 | 235 | 16.4 | 4.47 | 3.61 |
| C4  | 1.500 | 0.600 | 0.800 | — | 0.100 | Al2O3 | 0.5 | 278 | 224 | 17.2 | 4.47 | 3.61 |
| C5  | 1.500 | 0.300 | 0.900 | — | 0.300 | Al2O3 | 0.5 | 300 | 242 | 16.0 | 4.47 | 3.61 |
| C6  | 1.500 | 0.225 | 0.925 | — | 0.350 | Al2O3 | 0.5 | 311 | 251 | 15.4 | 4.47 | 3.61 |
| C7  | 1.500 | 0.450 | 0.850 | — | 0.200 | Al2O3 | 2.0 | 280 | 226 | 17.3 | 4.47 | 3.61 |
| C8  | 1.500 | 0.450 | 0.850 | — | 0.200 | ZrO2  | 0.5 | 280 | 226 | 17.1 | 4.47 | 3.61 |
| C9  | 1.500 | 0.450 | 0.850 | — | 0.200 | TiO2  | 0.5 | 280 | 226 | 17.1 | 4.47 | 3.61 |
| C10 | 1.500 | 0.450 | 0.850 | — | 0.200 | —     | —   | 280 | 226 | 17.1 | 4.47 | 3.61 | having zirconium oxide was formed on a surface of the particles of the solid solution positive electrode active material C1 and the solid solution positive electrode active material C8 was obtained. At that time, according to Example 1, the coating amount of a coating layer having $Al_2O_3$ was set at 0.5% by weight relative to the total amount of the solid solution positive electrode active material C6 coated with a coating layer (100% by weight).

(Solid Solution Positive Electrode Active Material C9)

According to Example 1, the solid solution positive electrode active material C1 before coating with metal oxide was prepared. Subsequently, by using tetraisopropoxy titan ($C_{14}H_{28}O_4Ti$, molecular weight of 284.22 g/mol), a coating layer having titan oxide was formed on a surface of the particles of the solid solution positive electrode active material C1 to obtain the solid solution positive electrode active material C9. At that time, forming of a coating layer was performed as follows.

First, to 100 g of pure water was added 10.0 g of solid solution positive electrode active material C1, and the resulting mixture was stirred and mixed to prepare a mixed solution. Subsequently, under stirring the mixed solution, a solution of tetraisopropoxy titan was slowly dropwise added thereto so as to precipitate titanium hydroxide on a surface of the particles of the solid solution positive electrode active material C1. Furthermore, stirring and mixing were continued for 5 hours. After that, the precipitate was filtered by suction, further washed with water sufficiently, and then dried at 100° C. for 1 hour in a dry oven. The dry powder was pulverized with a mortar and pestle, and then subjected to calcination at 450° C. for 5 hours to form a coating layer having titan oxide on a surface of the particles.

(Solid Solution Positive Electrode Active Material C10)

The solid solution positive electrode active material C1 of $Li_{1.5}[Ni_{0.45}Mn_{0.85}[Li]_{0.20}]O_3$ in which a coating layer having metal oxide is not formed was used as the solid solution positive electrode active material C10.

The positive electrodes C2 to C10 were produced, according to Example 1, by using each of the solid solution positive electrode active materials C2 to C10 which were prepared in the above. At that time, in order for the positive electrodes (Negative Electrode A2)

The negative electrode A2 was produced in the same manner as Example 1 except that the composition of the negative electrode slurry is as described below.

Negative electrode active material: Si-containing alloy ($Si_{49}Ti_{32}Sn_{19}$) 1.38 parts by weight Carbon material (manufactured by Hitachi Chemical Company, Ltd., graphite) 7.82 parts by weight Conductive aid: SuperP 0.40 parts by weight Binder: polyimide 0.40 parts by weight Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A2 were 7.57 mg/cm² and 1.60 g/cm³, respectively.

(Negative Electrode A3)

The negative electrode A3 was produced in the same manner as Example 1 except that the composition of the negative electrode slurry is as described below.

Negative electrode active material: Si-containing alloy ($Si_{53}Ti_{21}Sn_{26}$) 1.38 parts by weight Carbon material (manufactured by Hitachi Chemical Company, Ltd., graphite) 7.82 parts by weight Conductive aid: SuperP 0.40 parts by weight Binder: polyimide 0.40 parts by weight Solvent: N-methyl-2-pyrrolidone (NNP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A3 were 8.31 mg/cm² and 1.60 g/cm³, respectively.

(Negative Electrode A4)

The negative electrode A4 was produced in the same manner as Example 1 except that the composition of the negative electrode slurry is as described below.

Negative electrode active material: Si-containing alloy ($Si_{41}Ti_{15}Al_{43}$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1).

Furthermore, the weight and density of the negative electrode active material layer on a single surface of the negative electrode A4 were 7.27 mg/cm$^2$ and 1.60 g/cm$^3$, respectively.

(Negative Electrode A5)

The negative electrode A5 was produced in the same manner as Example 1 except that the composition of the negative electrode slurry is as described below.
Negative electrode active material: Si-containing alloy ($Si_{34}Sn_{13}V_{53}$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=\beta=0.8$, $\beta=78.2$, thus meeting the requirement of Formula (1). Furthermore, the weight and density of the negative electrode active material layer on a single surface of the negative electrode A5 were 9.10 mg/cm$^2$ and 1.60 g/cm$^3$, respectively.

(Negative Electrode A6)

The negative electrode A6 was produced in the same manner as Example 1 except that the composition of the negative electrode slurry is as described below.
Negative electrode active material: Si-containing alloy ($Si_{34}Sn_{41}C_{25}$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A6 were 7.72 mg/cm$^2$ and 1.60 g/cm$^3$, respectively.

(Negative Electrode A7)

The negative electrode A7 was produced in the same manner as Example 1 except that the composition of the negative electrode slurry is as described below.
Negative electrode active material: Si-containing alloy ($Si_{34}Zn_{23}V_{43}$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A7 were 9.16 mg/cm$^2$ and 1.60 g/cm$^3$, respectively.

(Negative Electrode A8)

The negative electrode A8 was produced in the same manner as Example 1 except that the composition of the negative electrode slurry is as described below.
Negative electrode active material: Si-containing alloy ($Si_{42}Zn_{53}Sn_5$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A8 were 6.51 mg/cm$^2$ and 1.60 g/cm$^3$, respectively.

(Negative Electrode A9)

The negative electrode A9 was produced in the same manner as Example 1 except that the composition of the negative electrode slurry is as described below.
Negative electrode active material: Si-containing alloy ($Si_{31}Zn_{40}Al_{29}$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A9 were 8.18 mg/cm$^2$ and 1.60 g/cm$^3$, respectively.

(Negative Electrode A10)

The negative electrode A10 was produced in the same manner as Example 1 except that the composition of the negative electrode slurry is as described below.
Negative electrode active material: Si-containing alloy ($Si_{53}Zn_{44}C_3$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A10 were 7.02 mg/cm$^2$ and 1.60 g/cm$^3$, respectively.

(Negative Electrode A11)

The negative electrode A11 was produced in the same manner as Example 1 except that the composition of the negative electrode slurry is as described below.
Negative electrode active material: Si-containing alloy ($Si_{50}Al_{47}C_3$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A11 were 7.68 mg/cm$^2$ and 1.60 g/cm$^3$, respectively.

(Negative Electrode A12)

The negative electrode A12 was produced in the same manner as Example 1 except that the composition of the negative electrode slurry is as described below.
Negative electrode active material: Si-containing alloy (Si$_{67}$Al$_{22}$Nb$_{11}$) 1.38 parts by weight
Carbon material (manufactured by Hitachi Chemical Company, Ltd., graphite) 7.82 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=13.8$, $\beta=78.2$, thus meeting the requirement of Formula (1). Furthermore, the weight and density of the negative electrode active material layer on a single surface of the negative electrode A12 were 7.85 mg/cm$^2$ and 1.60 g/cm$^3$, respectively.

(Negative Electrode A13)

The negative electrode A13 was produced in the same manner as Example 1 except that the composition of the negative electrode slurry is as described below.
Negative electrode active material: carbon material (manufactured by Hitachi Chemical Company, Ltd., graphite) 9.2 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=0$, $\beta=92.0$, thus not meeting the requirement of Formula (1). Furthermore, the weight and density of the negative electrode active material layer on a single surface of the negative electrode A13 were 12.75 mg/cm$^2$ and 1.60 g/cm$^3$, respectively.

(Negative Electrode A14)

The negative electrode A4 was produced in the same manner as Example 1 except that the composition of the negative electrode slurry is as described below.
Negative electrode active material: Si-containing alloy (Si$_{29}$Ti$_{62}$Ge$_9$) 9.2 parts by weight
Conductive aid: SuperP 0.40 parts by weight
Binder: polyimide 0.40 parts by weight
Solvent: N-methyl-2-pyrrolidone (NMP) 10.0 parts by weight.

When this composition is applied to Formula (1), $\alpha+\beta=92.0$, $\alpha=92.0$, $\beta=0$, thus not meeting the requirement of Formula (1). Furthermore, the weight and density of the negative electrode active material layer on a single surface of the negative electrode A14 were 3.55 mg/cm$^2$ and 1.60 g/cm$^3$, respectively.

Meanwhile, for producing the above negative electrodes A1 to A12, in order for the negative electrodes A2 to A12 to have discharge capacity of 4.08 mAh/cm$^2$, the coating amount was adjusted in consideration of the irreversible capacity of the negative electrode active material, the composition of the negative electrode slurry and the like. The composition of the obtained negative electrodes A1 to A14 and measured values of charge capacity and discharge capacity are summarized in the following Table 2. In Table 2, "$\gamma$" and "$\eta$" indicates % by weight of a binder and a conductive aid, respectively, in the negative electrode active material layer.

TABLE 2

| Negative electrode | Alloy composition | | | Alloy discharge capacity | $[\alpha]/[\alpha+\beta]$ | | | | Charge capacity | Discharge capacity | Coating amount | Charge capacity | Discharge capacity |
|---|---|---|---|---|---|---|---|---|---|---|---|---|---|
| | wt % | wt % | wt % | | $\alpha$ | $\beta$ | $\gamma$ | $\eta$ | wt % | mAh/g | mAh/g | mg/cm2 | mAh/cm2 | mAh/cm2 |
| | Electrode composition wt % | | | | | | | | | | | | | |
| A1 | Si 29 | Ti 62 | Ge 9 | mAh/g 1149 | 13.8 | 78.2 | 4.0 | 4.0 | 15 | 570 | 481 | 8.48 | 4.84 | 4.08 |
| A2 | Si 49 | Ti 32 | Sn 19 | mAh/g 1538 | 13.8 | 78.2 | 4.0 | 4.0 | 15 | 639 | 539 | 7.57 | 4.83 | 4.08 |
| A3 | Si 53 | Ti 21 | Zn 26 | mAh/g 1216 | 13.8 | 78.2 | 4.0 | 4.0 | 15 | 582 | 491 | 8.31 | 4.84 | 4.08 |
| A4 | Si 41 | Sn 15 | Al 43 | mAh/g 1707 | 13.8 | 78.2 | 4.0 | 4.0 | 15 | 669 | 565 | 7.23 | 4.83 | 4.08 |
| A5 | Si 34 | Sn 13 | V 53 | mAh/g 931 | 13.8 | 78.2 | 4.0 | 4.0 | 15 | 532 | 448 | 9.10 | 4.84 | 4.08 |
| A6 | Si 34 | Sn 41 | C 25 | mAh/g 1466 | 13.8 | 78.2 | 4.0 | 4.0 | 15 | 626 | 528 | 7.72 | 4.83 | 4.08 |
| A7 | Si 34 | Zn 23 | V 43 | mAh/g 912 | 13.8 | 78.2 | 4.0 | 4.0 | 15 | 528 | 445 | 9.16 | 4.84 | 4.08 |
| A8 | Si 42 | Zn 53 | Sn 5 | mAh/g 2121 | 13.8 | 78.2 | 4.0 | 4.0 | 15 | 742 | 627 | 6.51 | 4.83 | 4.08 |
| A9 | Si 31 | Zn 40 | Al 29 | mAh/g 1268 | 13.8 | 78.2 | 4.0 | 4.0 | 15 | 591 | 499 | 8.18 | 4.84 | 4.08 |
| A10 | Si 53 | Zn 44 | C 3 | mAh/g 1819 | 13.8 | 78.2 | 4.0 | 4.0 | 15 | 688 | 581 | 7.02 | 4.83 | 4.08 |
| A11 | Si 50 | Al 47 | C 3 | mAh/g 1484 | 13.8 | 78.2 | 4.0 | 4.0 | 15 | 629 | 531 | 7.68 | 4.83 | 4.08 |
| A12 | Si 67 | Al 22 | Nb 11 | mAh/g 1408 | 13.8 | 78.2 | 4.0 | 4.0 | 15 | 616 | 520 | 7.85 | 4.83 | 4.08 |

TABLE 2-continued

| | | | | Composition wt % | | | | | | | | |
|---|---|---|---|---|---|---|---|---|---|---|---|---|
| A13 | | | | | 0 | 94.5 | 3.5 | 2.0 | 0 | 390 | 363 | 12.75 | 4.70 | 4.37 |
| A14 | Si | Ti | Ge | mAh/g | 92.0 | 0.0 | 4.0 | 4.0 | 15 | 1352 | 1149 | 3.55 | 4.80 | 4.08 |
| | 29 | 62 | 9 | 1149 | | | | | | | | | | |

Subsequently, by combining the positive electrodes C1 to 010 obtained above with the negative electrodes A1 to A14 obtained above according to the description shown in the following Table 3, a battery was fabricated according to Example 1 (Examples 1 to 20 and Comparative Examples 1 to 5).

Thereafter, the power generating element of each battery obtained above was set at an evaluation cell mounting jig, and a positive electrode lead and a negative electrode lead were attached to each tab end of the power generating element, and tests were then performed.

[Evaluation of Battery Characteristics]

For the laminate type battery produced in the above, an initial charging treatment and an activation treatment were performed at the following conditions and performance was evaluated.

[Initial Charge Treatment]

An aging treatment of the battery was performed as follows. Charging was performed at 25° C. at 0.05 C for 4 hours (SOC: about 20%) by a constant current charging method. Subsequently, the battery was charged at 25° C. with rate of 0.1 C to 4.45 V. Thereafter, charging was stopped, and the battery was allowed to stand in that state (SOC: about 70%) about for two days (48 hours).

[Gas Removing Treatment 1]

The one side temporarily sealed by thermocompression bonding was unsealed. Gas was removed at 10±3 hPa for five minutes. Thereafter, the one side was subjected to thermocompression bonding again to perform temporary sealing. In addition, pressure molding (contact pressure 0.5±0.1 MPa) was performed using a roller to make the electrode adhere to the separator sufficiently.

[Activation Treatment]

Two cycles of charging at 25° C. at 0.1 C until the voltage became 4.45 V by a constant current charging method and thereafter, discharging at 0.1 C to 2.0 V, were performed. Similarly, one cycle of charging at 25° C. at 0.1 C until the voltage became 4.55 V by a constant current charging method and then discharging at 0.1 C to 2.0 V, and one cycle of charging at 0.1 C until the voltage became 4.65 V and then discharging at 0.1 C to 2.0 V, were performed. Furthermore, one cycle of charging at 25° C. at 0.1 C until the voltage became 4.75 V by a constant current charging method and then discharging at 0.1 C to 2.0 V was performed.

[Gas Removing Treatment 2]

The one side temporarily sealed by thermocompression bonding was unsealed. Gas was removed at 10±3 hPa for five minutes. Thereafter, the one side was subjected to thermocompression bonding again to perform regular sealing. In addition, pressure molding (contact pressure: 0.5±0.1 MPa) was performed using a roller to make the electrode adhere to the separator sufficiently.

[Evaluation of Rate Characteristics]

Evaluation of the battery rate characteristics was performed as follows. That is, the battery was charged by a constant current constant voltage charging method in which the battery was charged at rate of 0.1 C until the maximum voltage became 4.5 V, and then the battery was allowed to stand about for 1 hour to 1.5 hours. The battery was discharged by a constant current discharge method in which the battery was discharged at rate of 0.1 C or at rate of 2.5 C until the battery minimum voltage becomes 2.0 V. All tests were performed at room temperature. The rate characteristics were evaluated in terms of the ratio of capacity at discharge at 2.5 C relative to capacity at discharge at 0.1 C. Results are shown in Table 3.

[Evaluation of Battery Lifetime]

In a life time test of the battery, 100 cycles of the above charging and discharging at rate of 1.0 C were repeated at 25° C. Battery evaluation was performed as follows. That is, the battery was charged by a constant current constant voltage charging method in which the battery was charged at rate of 0.1 C until the maximum voltage became 4.5 V, and then the battery was allowed to stand about for 1 hour to 1.5 hours. The battery was discharged by a constant current discharge method in which the battery was discharged at rate of 0.1 C until the battery minimum voltage became 2.0 V. All tests were performed at room temperature.

The ratio of the discharge capacity at the $100^{th}$ cycle with respect to the discharge capacity at the $1^{st}$ cycle was referred to as "capacity retention rate (%)". Results are shown in Table 3 below.

Capacity retention rate (%)=Discharge capacity at the $100^{th}$ cycle/Discharge capacity at the $1^{st}$ cycle×100

TABLE 3

| | Positive electrode | Coating amount mg/cm2 | Negative electrode | Coating amount mg/cm2 | Capacity retention rate % at the $100^{th}$ cycle | 2.5 C/ 0.1 C Capacity retention rate % |
|---|---|---|---|---|---|---|
| Example | | | | | | |
| 1 | C1 | 17.1 | A1 | 8.48 | 90 | 89 |
| 2 | C1 | 17.1 | A2 | 7.57 | 90 | 90 |
| 3 | C1 | 17.1 | A3 | 8.31 | 90 | 88 |
| 4 | C1 | 17.1 | A4 | 7.23 | 92 | 92 |
| 5 | C1 | 17.1 | A5 | 9.10 | 87 | 86 |
| 6 | C1 | 17.1 | A6 | 7.72 | 85 | 91 |
| 7 | C1 | 17.1 | A7 | 9.16 | 88 | 90 |
| 8 | C1 | 17.1 | A8 | 6.51 | 94 | 94 |
| 9 | C1 | 17.1 | A9 | 8.18 | 95 | 89 |
| 10 | C1 | 17.1 | A10 | 7.02 | 89 | 91 |
| 11 | C1 | 17.1 | A11 | 7.68 | 85 | 90 |
| 12 | C1 | 17.1 | A12 | 7.85 | 94 | 91 |
| 13 | C2 | 17.2 | A1 | 8.48 | 91 | 90 |
| 14 | C3 | 16.4 | A1 | 8.48 | 91 | 87 |
| 15 | C4 | 17.2 | A1 | 8.48 | 93 | 91 |
| 16 | C5 | 16.0 | A1 | 8.48 | 86 | 83 |
| 17 | C6 | 15.4 | A1 | 8.48 | 84 | 76 |
| 18 | C7 | 17.3 | A1 | 8.48 | 97 | 87 |
| 19 | C8 | 17.1 | A1 | 8.48 | 94 | 89 |
| 20 | C9 | 17.1 | A1 | 8.48 | 97 | 91 |
| Comparative Example | | | | | | |
| 1 | C1 | 17.1 | A13 | 12.75 | 81 | 69 |
| 2 | C1 | 17.1 | A14 | 3.55 | 63 | 82 |
| 3 | C10 | 17.0 | A1 | 8.48 | 82 | 84 |
| 4 | C10 | 17.0 | A13 | 12.75 | 76 | 67 |
| 5 | C10 | 17.0 | A14 | 3.55 | 58 | 80 |

As it is clearly shown in the results of Table 3, the lithium ion secondary battery of Examples 1 to 20, which are an electrical device according to the present invention, exhibited excellent characteristics both in terms of the cycle characteristics (capacity retention rate at the 100th cycle) and the rate characteristics (2.5 C/0.1 C capacity retention rate) when compared to Comparative Examples 1 to 5.

Meanwhile, according to Comparative Example 1 and Comparative Example 4 in which the negative electrode A13 is used, sufficient rate characteristics were not obtained as the coating amount in a negative electrode active material layer is excessively high. Meanwhile, according to Comparative Example 2 and Comparative Example 5 in which the negative electrode A14 is used, the coating amount in a negative electrode active material layer is excessively low so that an excessively high load is applied to a negative electrode active material. As a result, sufficient cycle durability cannot be obtained. Furthermore, in the case of using the positive electrode C10 containing a solid solution positive electrode active material, in which a coating layer having metal oxide is not formed, it was impossible to achieve sufficient cycle durability and rate characteristics even when the negative electrode A1 was used.

REFERENCE SIGNS LIST

10, 50 Lithium ion secondary battery
11 Negative electrode current collector
12 Positive electrode current collector
13 Negative electrode active material layer
15 Positive electrode active material layer
17 Separator
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:

1. An electrical device comprising a power generating element containing
a positive electrode in which a positive electrode active material layer containing a positive electrode active material is formed on a surface of a positive electrode current collector,
a negative electrode in which a negative electrode active material layer containing a negative electrode active material is formed on a surface of a negative electrode current collector, and
a separator,
wherein a coating amount of the negative electrode active material layer is 6.51 to 9.16 mg/cm$^2$, the negative electrode active material layer contains the negative electrode active material represented by a following Formula (1):

$$\alpha(\text{Si-containing alloy}) + \beta(\text{carbon material}) \quad (1),$$

wherein the Si-containing alloy and the carbon material are in a non-composite form with each other,
in the Formula (1), $\alpha$ and $\beta$ represent % by weight of each component in the negative electrode active material layer, and $80 \leq \alpha+\beta \leq 98$, $3 \leq \alpha \leq 40$, and $40 \leq \beta \leq 95$,
the positive electrode active material layer contains the positive electrode active material represented by a following Formula (2):

$$e(\text{solid solution positive electrode active material}) \quad (2),$$

in the Formula (2), e represents % by weight of each component in the positive electrode active material layer, and $80 \leq e \leq 98$,
wherein the solid solution positive electrode active material has a composition represented by a following Formula (3):

$$\text{Li}_{1.5}[\text{Ni}_a\text{Mn}_b\text{Co}_c[\text{Li}]_d]\text{O}_z \quad (3),$$

in the Formula (3), z represents an oxygen number for satisfying an atomic valence and $a+b+c+d=1.5$, $0.1 \leq d \leq 0.4$, and $1.1 \leq [a+b+c] \leq 1.4$, and
a coating layer comprising oxide or composite oxide of Zr or Ti is formed on a surface of a particle of the solid solution positive electrode active material and a content of the oxide or composite oxide in the solid solution positive electrode active material is 0.1 to 3.0% by weight in terms of oxide.

2. The electrical device according to claim 1, wherein a thickness of the coating layer is 2 to 20 nm.

3. The electrical device according to claim 1, wherein the Si-containing alloy is one or more members selected from the group consisting of $\text{Si}_x\text{Ti}_y\text{Ge}_z\text{A}_a$, $\text{Si}_x\text{Ti}_y\text{Zn}_z\text{A}_a$, $\text{Si}_x\text{Ti}_y\text{Sn}_z\text{A}_a$, $\text{Si}_x\text{Sn}_y\text{Al}_z\text{A}_a$, $\text{Si}_x\text{Sn}_y\text{V}_z\text{A}_a$, $\text{Si}_x\text{Sn}_y\text{C}_z\text{A}_a$, $\text{Si}_x\text{Zn}_y\text{V}_z\text{A}_a$, $\text{Si}_x\text{Zn}_y\text{Sn}_z\text{A}_a$, $\text{Si}_x\text{Zn}_y\text{Al}_z\text{A}_a$, $\text{Si}_x\text{Zn}_y\text{C}_z\text{A}_a$, $\text{Si}_x\text{Al}_y\text{C}_z\text{A}_a$, and $\text{Si}_x\text{Al}_y\text{Nb}_z\text{A}_a$, in the formulae, A indicates inevitable impurity, x, y, z and a represent values of % by weight, $0<x<100$, $0<y<100$, $0<z<100$, $0 \leq a<0.5$, and $x+y+z+a=100$.

4. The electrical device according to claim 1, wherein the electrical device is a lithium ion secondary battery.

* * * * *